United States Patent
Xu et al.

(10) Patent No.: US 11,963,050 B2
(45) Date of Patent: Apr. 16, 2024

(54) METHOD FOR SUPPORTING HANDOVER IN MOBILE COMMUNICATION NETWORK

(71) Applicant: Samsung Electronics Co., Ltd., Suwon-si (KR)

(72) Inventors: Lixiang Xu, Beijing (CN); Hong Wang, Beijing (CN); Xiaoning Ma, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/169,108

(22) Filed: Feb. 14, 2023

(65) Prior Publication Data

US 2023/0199582 A1 Jun. 22, 2023

Related U.S. Application Data

(62) Division of application No. 16/947,231, filed on Jul. 23, 2020, now Pat. No. 11,611,917.

(30) Foreign Application Priority Data

Jul. 23, 2019 (CN) .......................... 201910667347.4
Dec. 16, 2019 (CN) .......................... 201911296462.1
Apr. 21, 2020 (CN) .......................... 202010318866.2

(51) Int. Cl.
*H04W 36/00* (2009.01)
*H04W 36/08* (2009.01)

(52) U.S. Cl.
CPC ... *H04W 36/0069* (2018.08); *H04W 36/0033* (2013.01); *H04W 36/0066* (2013.01); *H04W 36/08* (2013.01)

(58) Field of Classification Search
CPC . H04W 36/14; H04W 36/0069; H04W 80/08; H04W 36/0066; H04W 36/0033; H04W 76/15; H04W 36/0083
See application file for complete search history.

(56) References Cited

U.S. PATENT DOCUMENTS 10,362,519 B2  7/2019  Dai et al.
2015/0215824 A1  7/2015  Nigam et al.
(Continued)

FOREIGN PATENT DOCUMENTS

CN 104796950 A 7/2015
CN 109803334 A 5/2019
(Continued)

OTHER PUBLICATIONS

International Search Report and Written Opinion of the International Searching Authority in connection with International Application No. PCT/KR2020/009741 dated Oct. 27, 2020, 8 pages.
(Continued)

*Primary Examiner* — Allahyar Kasraian

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to embodiments, an access and mobility management function (AMF) comprises at least one transceiver; and at least one processor, wherein the at least one processor is configured to receive, a mobility management entity (MME) for an evolved node B (eNB), a message associated with a handover required message for an inter-system handover from an evolved packet system (EPS) to 5G system (5GS) with a secondary gNB (SgNB) used as a target next generation node B (gNB), wherein the SgNB and the target gNB are co-located and the eNB is associated with the SgNB in a dual connectivity; transmit, to the target gNB, a handover
(Continued)

request message for the inter-system handover from the EPS to 5GS with the SgNB used as the target gNB; and receive, from the target gNB, an acknowledge of the handover request message. The handover required message includes an SgNB user equipment (UE) X2 application protocol ID (SgNB UE X2AP ID) for identifying a UE over X2 interface in the SgNB. The handover request message includes the SgNB UE X2AP ID, and the SgNB UE X2AP ID is allocated at the SgNB.

20 Claims, 16 Drawing Sheets

(56) References Cited

U.S. PATENT DOCUMENTS

| | | | |
|---|---|---|---|
| 2017/0013532 A1* | 1/2017 | Olofsson | H04W 36/38 |
| 2018/0041932 A1 | 2/2018 | Mitsui et al. | |
| 2018/0192337 A1 | 7/2018 | Ryu et al. | |
| 2018/0199245 A1 | 7/2018 | Futaki et al. | |
| 2020/0029389 A1 | 1/2020 | Yilmaz et al. | |
| 2020/0053616 A1 | 2/2020 | Zhu et al. | |
| 2020/0120552 A1* | 4/2020 | Yang | H04W 36/0069 |
| 2020/0128454 A1 | 4/2020 | Teyeb et al. | |
| 2020/0229059 A1 | 7/2020 | Xu et al. | |
| 2020/0322851 A1 | 10/2020 | Sun et al. | |
| 2020/0367215 A1* | 11/2020 | Futaki | H04W 24/10 |
| 2021/0022057 A1* | 1/2021 | Sabouri-Sichani | H04W 74/0833 |
| 2021/0289402 A1 | 9/2021 | Ke et al. | |
| 2021/0345196 A1 | 11/2021 | Viering et al. | |
| 2021/0385704 A1 | 12/2021 | Mayer et al. | |
| 2022/0141719 A1 | 5/2022 | Shan | |
| 2022/0141736 A1 | 5/2022 | Muller et al. | |
| 2022/0150763 A1* | 5/2022 | Godin | H04W 36/0069 |

FOREIGN PATENT DOCUMENTS

| | | |
|---|---|---|
| KR | 10-2017-0108095 A | 9/2017 |
| WO | 2018085416 A1 | 5/2018 |
| WO | 2018145657 A1 | 8/2018 |
| WO | 2019066544 A1 | 4/2019 |
| WO | WO-2019244940 A1 * | 12/2019 ........ H04W 36/0033 |

OTHER PUBLICATIONS

Supplementary European Search Report dated Aug. 17, 2022 in connection with European Patent Application No. 20 84 3000, 16 pages.
Notice of Patent Grant dated Jul. 4, 2022 in connection with Korean Patent Application No. 10-2022-7006207, 5 pages.
3GPP TS 23.502 V16.1.0 (Jun. 2019), Technical Specification, 3rd Generation Partnership Project; Technical Specification Group Services and System Aspects; Procedures for the 5G System; Stage 2 (Release 16), Jun. 2019, 500 pages.
3GPP TS 23.502 V16.1.1 (Jun. 2019), Technical Specification, 3rd Generation Partnership Project; Technical Specification Group Services and System Aspects; Procedures for the 5G System; Stage 2 (Release 16), Jun. 2019, 494 pages.
3GPP TS 37.340 V15.6.0 (Jun. 2019), Technical Specification, 3rd Generation Partnership Project; Technical Specification Group Radio Access Network; Evolved Universal Terrestrial Radio Access (E-UTRA) and NR; Multi-connectivity; Stage 2 (Release 15), Jun. 2019, 69 pages.
Chandramouli et al., "Access Control and Mobility Management", Mar. 8, 2019, 58 pages.
"5G; NG-RAN; Xn Application Protocol (XnAP)(3GPP TS 38.423 version 15.4.0 Release 15)", ETSI TS 138 423 V15.4.0 (Jul. 2019), 308 pages.
Ericsson, "Support of handover between NR-DC and E-UTRA," R2-1906131, Resubmission of R2-1904627, 3GPP TSG-RAN WG2#106, Reno, USA, May 13-17, 2019, 3 pages.
Nokia, et al., "Inter-system direct forwarding with shared en-gNB/gNB," R3-202801, 3GPP TSG-RAN WG3#107bis-e, E-Meeting, Apr. 20-30, 2020, 5 pages.
Communication pursuant to Article 94(3) EPC dated Apr. 17, 2023, in connection with European Application No. 20843000.9, 7 pages.
Office Action dated Apr. 25, 2023, in connection with Chinese Application No. 202010318866.2, 17 pages.
Ericsson, "Collected corrections for XnAP version 15.0.0," R3-185321, 3GPP TSG-RAN WG3 Meeting #101, Gothenburg, Sweden, Aug. 20-24, 2018, 264 pages.

* cited by examiner

METHOD FOR SUPPORTING HANDOVER IN MOBILE COMMUNICATION NETWORK

CROSS-REFERENCE TO RELATED APPLICATIONS

This application is divisional of U.S. application Ser. No. 16/947,231, filed Jul. 23, 2020, which is based on and claims priority under 35 U.S.C. § 119 to Chinese Patent Application No. 201910667347.4, filed on Jul. 23, 2019, Chinese Patent Application No. 201911296462.1, filed on Dec. 16, 2019, and Chinese Patent Application No. 202010318866.2, filed on Apr. 21, 2020, the disclosures of which are incorporated herein by reference, in their entireties.

BACKGROUND

1. Field

The present disclosure relates to the field of mobile communication technologies, and in particular to a method for supporting handover in a mobile communication network.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a 5G wireless communication system, clock synchronization between nodes in the system is required for normal use of the system.

In a 5G communication system, network elements involve different types such as a user equipment (UE), an access node as a next generation node B (gNB), an access and mobility management function entity (AMF), a session management function entity (SMF) and a data plane function entity, that is user plane function (UPF). Among them, the AMF, the SMF and the UPF belong to the core network elements.

In an Evolved Packet System (EPS) communication system, network elements involve different types such as a UE, an access node (eNB), a mobility management entity (MME), a serving gateway (SGW) and a packet data network gateway (PGW). Among them, the MME, the SGW and the PGW belong to the core network elements.

The UE may perform handover in a same communication system or between different communication systems. For example, the UE may perform handover between access nodes of a 5G communication system, that is, Intra-system handover. The UE may also perform handover between an access node of a 5G communication system and an access node of an EPS communication system, that is, Inter-system handover.

FIG. 1 is a schematic diagram of a system architecture when a UE performs handover.

The UE performs handover from a source access node (i.e., an access node 1 connected to a core network 1) to a target access node (i.e., an access node 2 connected to a core network 2).

FIG. 2 is a schematic diagram that a UE establishes wireless connections with two access nodes at the same time.

When the UE is in the dual connectivity state, it means that the UE establishes a wireless connection with one access node while establishing a wireless connection with the other access node. One access node is a Master Node. The Master Node is connected to the UE through a control plane indicated by a solid line and a user plane indicated by a broken line. The other access node is a Secondary Node (SN). The SN may be connected to the UE through the user plane. The two access nodes may be connected to core network of a same communication system, for example, the two access nodes may both be gNBs connected with a 5G core network. The two access nodes may also be connected to core networks of different communication systems, for example, the two access nodes may be a gNB connected with the core network of a 5G communication system and an eNB connected with the core network of an EPS communication system, respectively.

SUMMARY

In view of the above one or more problems, the present invention provides a method for supporting handover in a mobile communication system.

According to an embodiment of the present disclosure, there is provided a method for a handover of a UE, comprising: sending by a source base station a first message to a core network element connected with the source base station, the first message carrying UE identification information for identifying the UE.

Optionally, the first message carries secondary base station identification information for identifying a secondary base station.

Optionally, the first message carries a source base station identifier for identifying the source base station and/or a source cell identifier for identifying a source cell and/or a measurement result of the UE.

Optionally, the first message is a handover request message of base station-core network interface application protocol signaling.

Optionally, the method further comprises: receiving by the source base station an eighth message from the core network element connected with the source base station, the eighth message carrying a field for indicating whether the context of the UE that already exists on a secondary base station is to be kept after the handover.

Optionally, the method further comprises: receiving by the source base station an eighth message from the core network element connected with the source base station, the eighth message carrying the UE identification information for identifying the UE and/or a secondary base station identifier for identifying a secondary base station and/or a target base station identifier for identifying a target base station.

Optionally, the eighth message is a handover command message of base station-core network interface application protocol signaling.

Optionally, the field for indicating whether the context of the UE that already exists on the secondary base station is to be kept after the handover is a UE Context Kept Indicator field.

Optionally, the UE identification information is a UE identifier assigned by a secondary node to the UE.

Optionally, the UE identifier is an SgNB UE X2AP (X2 interface application protocol) ID or an S-NG-RAN node UE XnAP (Xn interface application protocol) ID.

Optionally, when the UE identification information is a cell radio network temporary identifier (C-RNTI) assigned by a secondary node to the UE, the first message further carries a primary secondary cell identifier of the UE at the secondary node and/or secondary base station identification information.

Optionally, the carrying is carrying directly by the message, or carrying by a subfield carried by a Source to Target Transparent Container field carried by the message.

Optionally, the subfield is a Source NG-RAN Node to Target NG-RAN Node Transparent Container field, or a Source eNB to Target eNB Transparent Container field.

Optionally, the carrying is carrying directly by the message, or carrying by a subfield carried by a Target to Source Transparent Container field carried by the message.

Optionally, the subfield is a Target NG-RAN Node to Source NG-RAN Node Transparent Container field, or a Target eNB to Source eNB Transparent Container field.

According to an embodiment of the present disclosure, there is provided an apparatus for a handover of a UE, the apparatus performing the above method.

According to an embodiment of the present disclosure, there is provided a computer device for a user equipment (UE), comprising a processor and a memory storing thereon instructions, which when executed by the processor, performing the above method.

According to an embodiment of the present disclosure, there is provided a method for a handover of a UE, comprising: receiving by a target base station a third message from a core network element connected with the target base station, the third message carrying UE identification information for identifying the UE.

Optionally, the third message carries secondary base station identification information for identifying a secondary base station.

Optionally, the third message carries a source base station identifier for identifying the source base station and/or a source cell identifier for identifying a source cell and/or a measurement result of the UE.

Optionally, the third message is a handover request message of base station-core network interface application protocol signaling.

Optionally, the method further comprises: sending by the target base station a fourth message to the secondary base station, the fourth message carrying the UE identification information and/or a field for indicating a trigger scenario for the current secondary node addition preparation process; and receiving by the target base station a fifth message from the secondary base station.

Optionally, the method further comprises: sending by the target base station a fourth message to the source base station, the fourth message carrying the UE identification information and/or a field for indicating the source cell identifier of the source cell; and receiving by the target base station a fifth message from the source base station, the fifth message carrying the UE identification information.

Optionally, the fourth message is a secondary node addition request message SGNB ADDITION REQUEST or S-NODE ADDITION REQUEST of inter-base station interface application protocol signaling.

Optionally, the fifth message is a secondary node addition request acknowledge message SGNB ADDITION REQUEST ACKNOWLEDGE or S-NODE ADDITION REQUEST ACKNOWLEDGE of inter-base station interface application protocol signaling.

Optionally, the field for indicating the trigger scenario for the current secondary node addition preparation process is a secondary base station addition trigger indication field, of inter-base station interface application protocol signaling, SGNB Addition Trigger Indication, and the value of the SGNB Addition Trigger Indication field is one of SN change, inter-eNB HO, intra-eNB HO, inter-NGRAN HO, intra-NGRAN HO, eNB-NGRAN HO and NGRAN-eNB HO.

Optionally, the field for indicating the trigger scenario for the current secondary node addition preparation process is a secondary base station addition trigger indication field, of inter-base station interface application protocol signaling, S-NODE Addition Trigger Indication, and the value of the S-NODE Addition Trigger Indication field is one of SN change, inter-eNB HO, intra-eNB HO, inter-NGRAN HO, intra-NGRAN HO, eNB-NGRAN HO and NGRAN-eNB HO.

Optionally, the method further comprises: sending by the target base station a sixth message to a core network element connected to the target base station, the sixth message carrying a field for indicating whether the context of the UE that already exists on the secondary base station is to be kept after the handover.

Optionally, the method further comprises: sending by the target base station a sixth message to a core network element connected to the target base station, the sixth message carrying the UE identification information and/or a secondary base station identifier for identifying the secondary base station and/or a target base station identifier for identifying a target base station.

Optionally, the sixth message is a handover request acknowledge message of base station-core network interface application protocol signaling.

Optionally, the field for indicating whether the context of the UE that already exists on the secondary base station is to be kept after the handover is a UE Context Kept Indicator field.

Optionally, the UE identification information is a UE identifier assigned to the UE by a secondary node.

Optionally, the UE identifier is an SgNB UE X2AP ID or an S-NG-RAN node UE XnAP ID.

Optionally, when the UE identification information is a cell RNTI assigned by a secondary node to the UE, the third message further carries a primary secondary cell identifier of the UE at the secondary node and/or secondary base station identification information.

Optionally, the carrying may be carrying directly by the message, or carrying by a subfield carried by a Source to Target Transparent Container field carried by the message.

Optionally, the subfield is a Source NG-RAN Node to Target NG-RAN Node Transparent Container field, or a Source eNB to Target eNB Transparent Container field.

Optionally, the carrying may be carrying directly by the message, or carrying by a subfield carried by a Target to Source Transparent Container field carried by the message.

Optionally, the subfield is a Target NG-RAN Node to Source NG-RAN Node Transparent Container field, or a Target eNB to Source eNB Transparent Container field.

According to an embodiment of the present disclosure, there is provided an apparatus for a handover of a UE, the apparatus performing the method as described above.

According to an embodiment of the present disclosure, there is provided a computer device for a User Equipment (UE), comprising a processor and a memory storing thereon instructions, which when executed by the processor, performing the method as described above.

According to an embodiment of the present disclosure, there is provided a method for a handover of a UE, comprising: receiving by a secondary base station a fourth message from a first master base station, the fourth message carrying UE identification information for identifying the UE and/or a field for indicating a trigger scenario for the current secondary node addition preparation process; and sending by the secondary base station a fifth message to the first master base station.

Optionally, the fourth message is a secondary node addition request message SGNB ADDITION REQUEST or S-NODE ADDITION REQUEST of inter-base station interface application protocol signaling.

Optionally, the fifth message is a secondary node addition request acknowledge message SGNB ADDITION REQUEST ACKNOWLEDGE or S-NODE ADDITION REQUEST ACKNOWLEDGE of inter-base station interface application protocol signaling.

Optionally, the field for indicating the trigger scenario for the current secondary node addition preparation process is a secondary base station addition trigger indication field, of inter-base station interface application protocol signaling, SGNB Addition Trigger Indication, and the value of the SGNB Addition Trigger Indication field is one of SN change, inter-eNB HO, intra-eNB HO, inter-NGRAN HO, intra-NGRAN HO, eNB-NGRAN HO and NGRAN-eNB HO.

Optionally, the field for indicating the trigger scenario for the current secondary node addition preparation process is a secondary base station addition trigger indication field, of inter-base station interface application protocol signaling, S-NODE Addition Trigger Indication, and the value of the S-NODE Addition Trigger Indication field is one of SN change, inter-eNB HO, intra-eNB HO, inter-NGRAN HO, intra-NGRAN HO, eNB-NGRAN HO and NGRAN-eNB HO.

Optionally, the UE identifier is an SgNB UE X2AP ID or an S-NG-RAN node UE XnAP ID.

Optionally, when the UE identification information is a cell RNTI assigned by a secondary node to the UE, the fourth message further carries a primary secondary cell identifier of the UE at the secondary node and/or secondary base station identification information.

According to an embodiment of the present disclosure, there is provided an apparatus for a handover of a UE, the apparatus performing the method as described above.

According to an embodiment of the present disclosure, there is provided a computer device for a user equipment (UE), comprising a processor and a memory storing thereon instructions, which when executed by the processor, performing the method as described above.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects, features and advantages of the present disclosure will become clearer and easier to understand through the following description of the embodiments in conjunction with the accompanying drawings, in which.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device The present application provides a method for supporting handover in a mobile communication network. In order to make the purpose, technical solution and advantages of the present application clearer, the present application is described in further detail below with reference to accompanying drawings and by way of examples.

The expressions such as "first", "second" and "third" in this specification are only for distinguishing purposes, and are not restrictive definitions.

In the following embodiments, a communication architecture in which a UE is connected to a core network element through an access node is shown. In the embodiments, the access node takes a gNB and an eNB as examples; and the core network element takes an AMF and an MME that provide mobility management functions as examples.

In the following embodiments, the following interface protocols are involved: X2 Application Protocol (X2AP), Xn Application Protocol (XnAP), NG Application Protocol (NGAP) and S1 Application Protocol (S1AP). It should be noted that, although embodiments of the present disclosure are described by taking the horizontal interfaces between two base stations being X2 and Xn as an example, the method in the present invention is also applicable to a case where it is other interface that between the two base stations. Although embodiments of the present invention is described by taking the interfaces between the base station and the core network being NG and S1 as an example, the method in the present invention is also applicable to a case where it is other interface that between the base station and the core network. That is to say, in this specification, X2AP and XnAP are instances of inter-base station interface application protocols, and NGAP and S1AP are instances of base station-core network interface application protocols.

Figure 1:
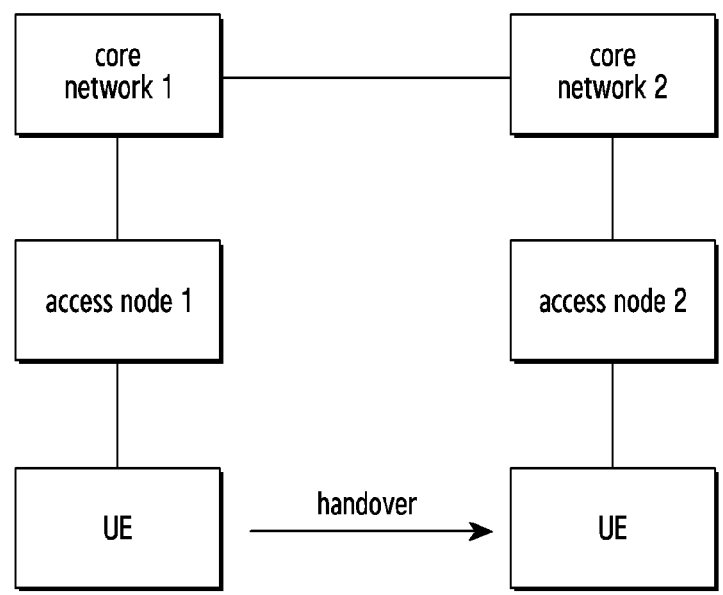
FIG. 1 shows a schematic diagram of a system architecture when a UE performs handover.
Figure 2:
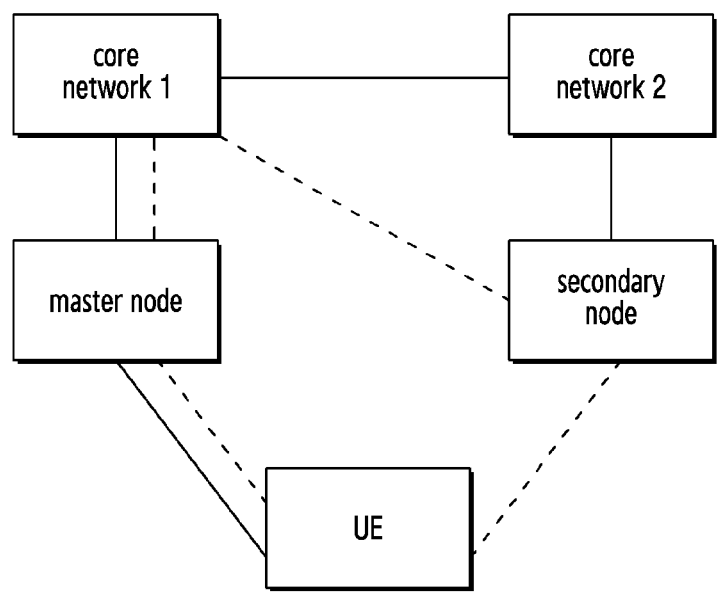
FIG. 2 shows a schematic diagram of a UE in a dual connectivity state.
Figure 3:
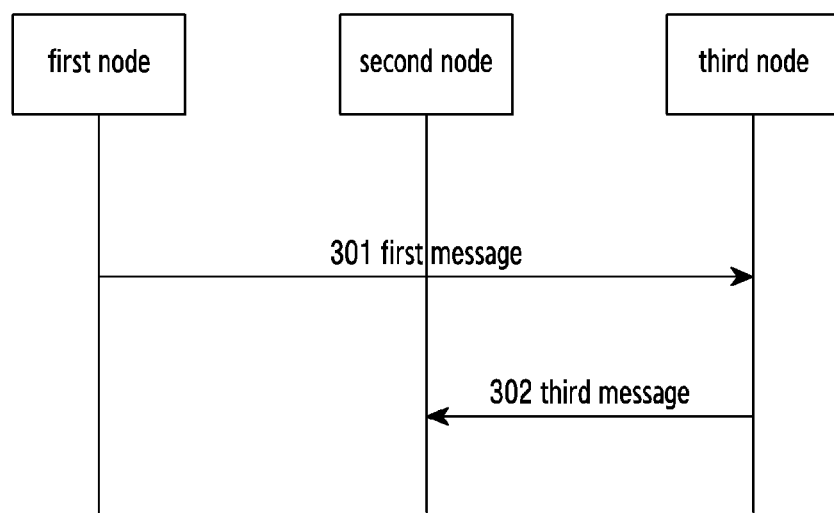
FIG. 3 shows a handover method.

FIG. 3 is a schematic diagram of a first embodiment. The first embodiment describes a handover method.

In the first embodiment, the handover method includes the following steps:

Step 301: A first node sends a first message to a third node, and the first message carries UE identification information.

Step 302: The third node sends a third message to a second node, and the third message carries the UE identification information in the first message.

Figure 4:
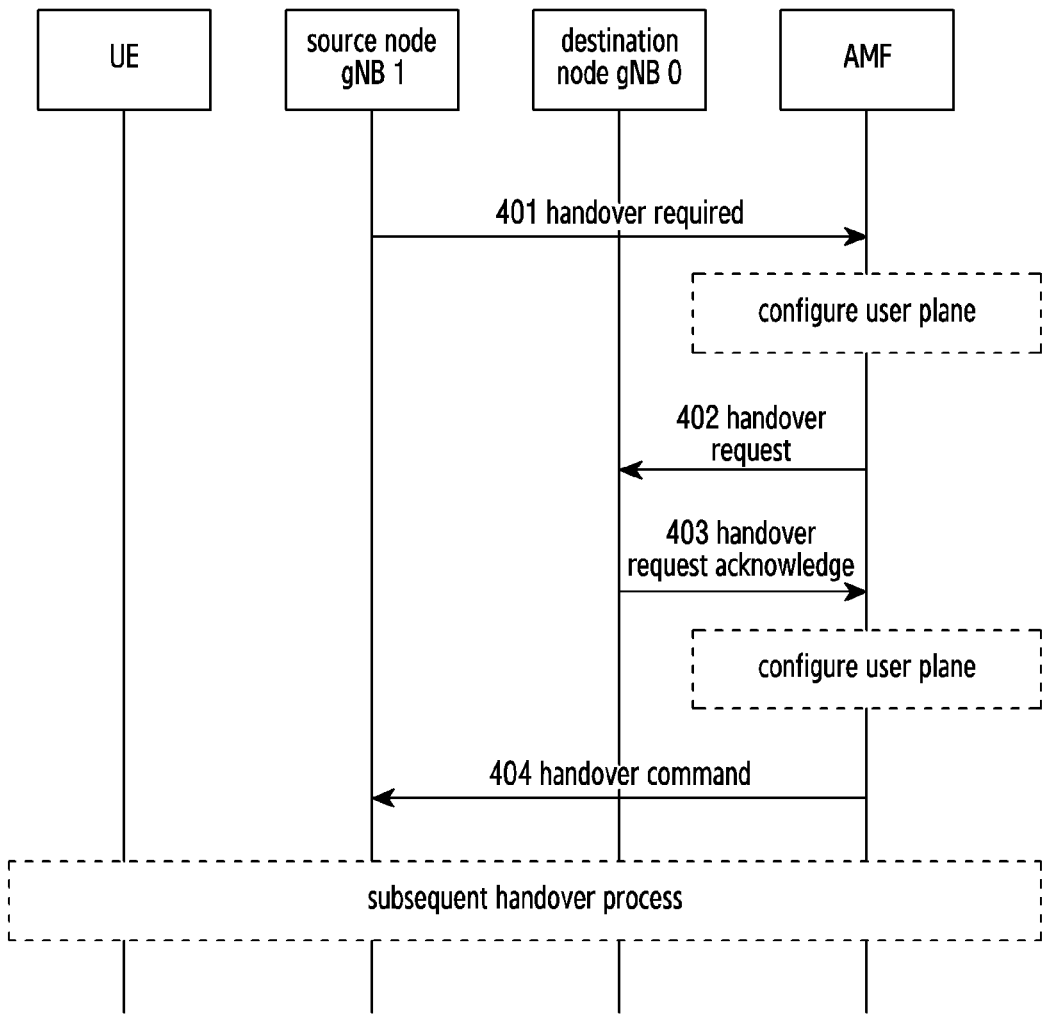
FIG. 4 shows a specific example of applying the handover method shown in FIG. 3 to an intra-system handover scenario of a 5G communication system.

FIG. 4 is a schematic diagram of a second embodiment. The second embodiment is one specific example of applying the handover method in the first embodiment to an intra-system handover scenario of a 5G communication system.

In the second embodiment, before the 5G intra-system handover is performed, the UE is in a dual connectivity state and connected to the master node gNB 1 and the secondary node gNB 0 at the same time; after the 5G intra-system handover is performed, the UE is only connected to gNB 0. It can be seen that, in the second embodiment, gNB 1 is a source node, gNB 0 is a target node, and the target node is the secondary node before the handover. The source node gNB 1 and the target node gNB 0 are both connected to the same core network element AMF.

The source node gNB 1 may correspond to the first node in the first embodiment, the target node gNB 0 may correspond to the second node in the first embodiment, and the AMF may correspond to the third node in the first embodiment.

In the above intra-system handover scenario of the 5G communication system, the handover method includes the following steps:

Step 401: The source node gNB 1 sends a first message to the AMF. The first message may be a HANDOVER REQUIRED message. The HANDOVER REQUIRED message is NGAP HANDOVER REQUIRED message in the present embodiment. The HANDOVER REQUIRED message carries UE identification information.

Specifically, the HANDOVER REQUIRED message carries a Source to Target Transparent Container field which may carry a Source NG-RAN Node to Target NG-RAN Node Transparent Container field. The Source NG-RAN Node to Target NG-RAN Node Transparent Container field may carry the UE identification information. Alternatively, the HANDOVER REQUIRED message may directly include an UE identification information.

Specifically, the UE identification information may be a UE identifier S-NG-RAN node UE XnAP ID assigned by the secondary node gNB 0 to the UE on the interface Xn. Alternatively, when the UE identification information is a Cell Radio Network Temporary Identity-value (C-RNTI) assigned by the secondary node gNB 0 to the UE, the HANDOVER REQUIRED message further carries a Primary Secondary Cell ID (PScell ID) of the UE at the secondary node gNB 0 or the identification information of the secondary node gNB 0.

Step 402: The AMF sends a third message to the target node gNB 0, and the third message may be a HANDOVER REQUEST message. In the present embodiment, the HANDOVER REQUEST message may be a NGAP HANDOVER REQUEST message, and the HANDOVER REQUEST message carries the UE identification information in the HANDOVER REQUIRED message.

Specifically, the AMF transparently forwards the content of the Source to Target Transparent Container field it receives to the target node gNB 0. Alternatively, if the UE identification information is directly carried by the HANDOVER REQUIRED message in step 401, the HANDOVER REQUEST message should also directly carry the UE identification information.

In the above step, when the UE identification information is the C-RNTI, the message carrying the UE identification information also carries the PScell ID of the UE at the secondary node gNB 0 or the identification information of the secondary node gNB 0.

The above scheme may be advantageous. Specifically, for the downlink data of the UE that has been transmitted to the target node gNB 0 but has not been transmitted to the UE before the handover is completed, since the target node gNB 0 is used as a secondary node before the handover, the target node gNB 0 may find the context of the UE that has been established on the target node gNB 0 according to the UE identification information. When the UE identification information is the C-RNTI, the target base station finds the context of the UE at the gNB 0 according to the received PScell ID of the UE at the secondary node gNB 0 and/or the secondary node identification information of the gNB 0 and the UE identifier C-RNTI. The target node gNB 0 does not need to perform data forwarding before and after handover as in the existing mechanism.

Step 403: The target node gNB 0 sends a sixth message to the AMF. The sixth message may be a HANDOVER REQUEST ACKNOWLEDGE message. The HANDOVER REQUEST ACKNOWLEDGE message is NGAP HANDOVER REQUEST ACKNOWLEDGE in the present embodiment.

Step 404: The AMF sends an eighth message to the source node gNB 1. The eighth message may be a HANDOVER COMMAND message. The HANDOVER COMMAND message is NGAP HANDOVER COMMAND message in the present embodiment.

Figure 5:
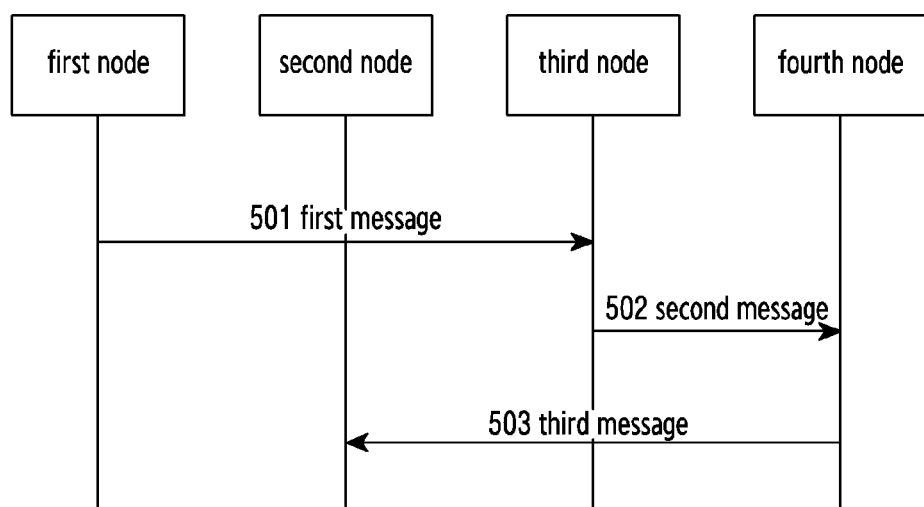
FIG. 5 shows a handover method.

FIG. 5 is a schematic diagram of a third embodiment. The third embodiment describes a handover method.

In the third embodiment, the handover method includes the following steps:

Step 501: A first node sends a first message to a third node, and the first message carries UE identification information.

Step 502: The third node sends a second message to a fourth node, and the second message carries the UE identification information in the first message.

Step 503: The fourth node sends a third message to a second node, and the third message carries the UE identification information in the second message.

Figure 6:
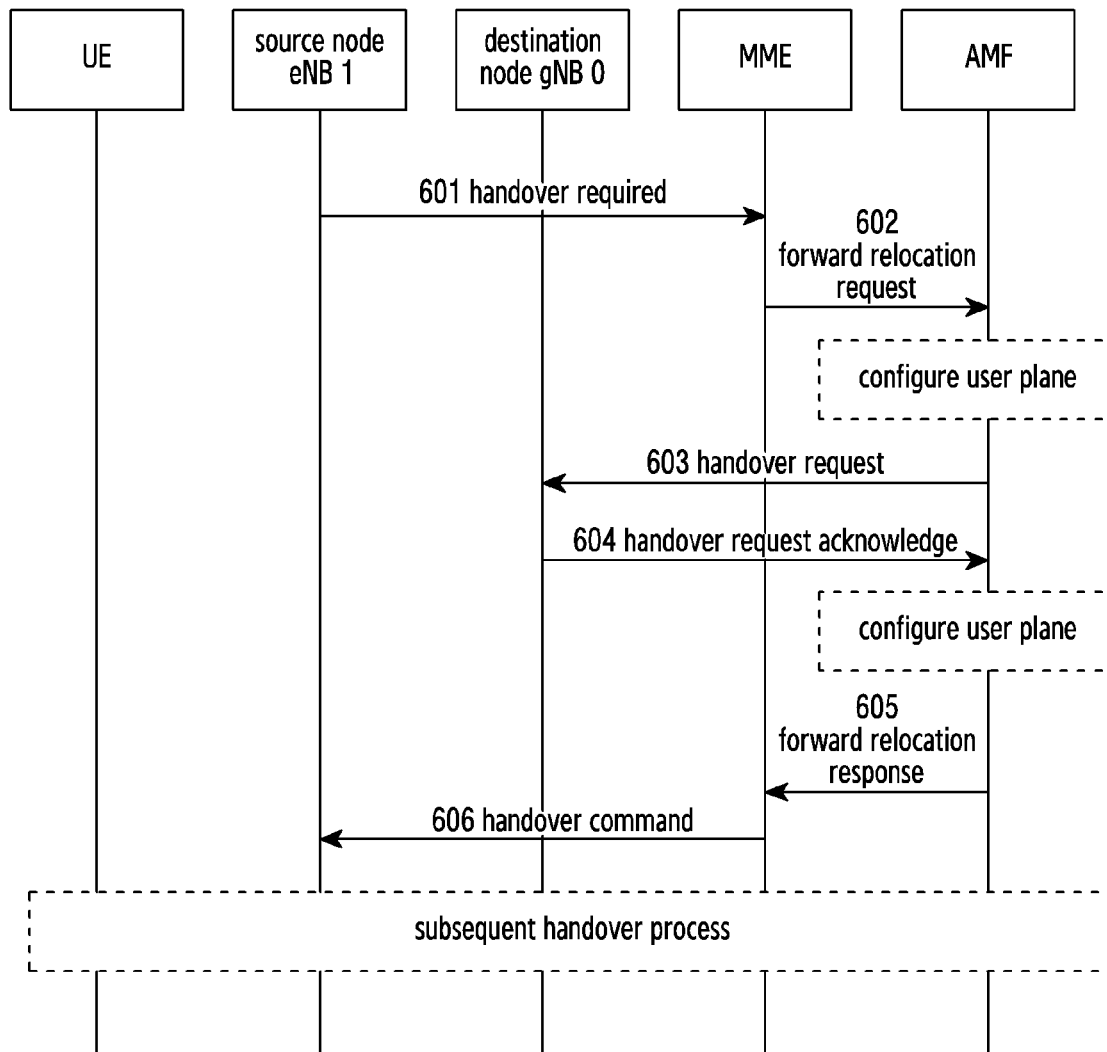
FIG. 6 shows a specific example of applying the handover method shown in FIG. 5 to an inter-system handover scenario from an EPS to a 5G communication system.

FIG. 6 is a schematic diagram of a fourth embodiment. The fourth embodiment is one specific example of applying the handover method in the third embodiment to an inter-system handover scenario from an EPS to a 5G communication system.

In the fourth embodiment, before the inter-system handover is performed, the UE is in a dual connectivity (DC) state, and is connected to the master node eNB 1 and the secondary node gNB 0 at the same time; after the inter-system handover is performed, the UE is only connected to the gNB 0. Hereinafter the dual connectivity state corresponds to an evolved UMTS Terrestrial Radio Access Network (E-UTRAN)—new radio (NR)-DC (EN-DC). The UMTS is referred as Universal Mobile Telecommunication System. It can be seen that, in the fourth embodiment, the eNB 1 is a source node, the gNB 0 is a target node, and the target node is a secondary node before the handover. The source node eNB 1 is connected to the MME, and the target node gNB 0 is connected to the AMF.

The source node eNB 1 may correspond to the first node in the third embodiment, the target node gNB 0 may correspond to the second node in the third embodiment, the MME may correspond to the third node in the third embodiment, and the AMF may correspond to the fourth node in the third embodiment.

In the above inter-system handover scenario from the EPS to the 5G communication system, the handover method includes the following steps:

Step 601: The source node eNB 1 sends a first message to the MME. The first message may be a HANDOVER REQUIRED message. The HANDOVER REQUIRED message is S1AP HANDOVER REQUIRED message in the present embodiment. The HANDOVER REQUIRED message carries UE identification information and/or secondary base station identification information.

Specifically, the HANDOVER REQUIRED message carries a Source to Target Transparent Container field. When the target base station is a NG-RAN node, the Source to Target Transparent Container field may carry a Source NG-RAN Node to Target NG-RAN Node Transparent Container. The Source NG-RAN Node to Target NG-RAN Node Transparent Container carries the UE identification information and/or the secondary base station identification information. Alternatively, the HANDOVER REQUIRED message may directly carry the UE identification information and/or the secondary base station identification information.

Specifically, the UE identification information may be a UE identifier SgNB UE X2AP ID assigned by the secondary node gNB 0 to the UE over X2 interface. Alternatively, the UE identification information may be an identifier C-RNTI assigned by the secondary node gNB 0 to the UE. When the UE identification information is the C-RNTI, the HANDOVER REQUIRED message further needs to include a PScell ID of UE at the secondary node gNB 0 and/or secondary node identification information of the gNB 0.

Step 602: The MME sends a second message to the AMF. The second message may be a FORWARD RELOCATION REQUEST message. The FORWARD RELOCATION REQUEST message is GPRS Tunneling Protocol (GTP) FORWARD RELOCATION REQUEST message in the present embodiment. The FORWARD RELOCATION REQUEST message carries the UE identification information and/or the secondary base station identification information received in the HANDOVER REQUIRED message.

Specifically, the MME transparently forwards the content of the Source to Target Transparent Container field it receives to the AMF. Alternatively, in step 601, if the UE identification information and/or the secondary base station identification information is directly carried by the HANDOVER REQUIRED message, the GTP control plane protocol signaling should also directly carry the UE identification information and/or the secondary base station identification information.

Step 603: The AMF sends a third message to the target node gNB 0. The third message may be a HANDOVER REQUEST message. The HANDOVER REQUEST message is NGAP HANDOVER REQUEST message in the present embodiment. The HANDOVER REQUEST message carries the UE identification information and/or the secondary base station identification information in the HANDOVER REQUIRED message.

Specifically, the AMF transparently forwards the content of the Source to Target Transparent Container field it receives to the target node gNB 0. Alternatively, in step 602, if the GTP control plane protocol signaling directly carries the UE identification information and/or the secondary base station identification information, the HANDOVER REQUEST message should also directly carry the UE identification information and/or the secondary base station identification information.

In the above step, when the UE identification information is the C-RNTI, the message carrying the UE identification information also carries the PScell ID of the UE at the secondary node gNB 0 or the identification information of the secondary node gNB 0.

The above scheme may be advantageous. Specifically, for the downlink data of the UE that has been transmitted to the target node gNB 0 but has not been transmitted to the UE before the handover is completed, since the target node gNB 0 is used as a secondary node before the handover, the target node gNB 0 may find the context of the UE that has been established on the target node gNB 0 according to the UE identification information and/or the secondary base station identification information, and the target node gNB 0 does not need to perform data forwarding before and after handover as in the existing mechanism. The target node gNB 0 can find the context of the UE that has been established on the target node gNB 0 according to the UE identification information and/or the secondary base station identification information, so as to know the bearer that has been configured on the secondary base station before handover (for example, a bearer terminated at the secondary node or a Secondary Cell Group (SCG) bearer). That is, the bearer is referred as an SN terminated bearer. For the bearer that has been configured on the secondary base station before the handover (for example, the bearer terminated at the secondary node or the SCG bearer), the data forwarding is performed in a node (i.e. the base station) internal way, without forwarding data from the source base station to the target base station as in the existing handover mechanism. When the UE identifier is the C-RNTI, the target base station finds the context of the UE at the gNB 0 according to the received PScell ID of the UE at the secondary node gNB 0 and/or the secondary node identification information of the gNB 0 and the UE identifier C-RNTI.

If the gNB 0 supports separate control plane and user plane architecture, the gNB 0 contains gNB centralized unit control plane unit (gNB-CU-CP) and gNB centralized unit user plane unit (gNB-CU-UP). The gNB0-CU-CP requests the gNB0-CU-UP to allocate tunnel information corresponding to each evolved radio access bearer E-RAB. The tunnel information contains the transport layer address and the tunnel identifier. The gNB0-CU-UP allocates tunnel information for data forwarding to each requested E-RAB and sends it to the gNB0-CU-CP. For the bearer(s) terminated at the gNB 0 at the source side, the gNB0-CU-CP does not need to request gNB0-CU-UP to allocate tunnel information for the E-RAB(s). The gNB0-CU-CP can find the UE context according to the received UE identification information and/or secondary base station identification information. The gNB0-CU-CP knows the bearer(s) terminated at the gNB0-CU-UP at the source side according to the UE context. The identification of the gNB0-CU-CP is the same as the secondary base station identification of gNB 0.

Step 604: The target node gNB 0 sends a sixth message to the AMF. The sixth message may be a HANDOVER REQUEST ACKNOWLEDGE message. The HANDOVER REQUEST ACKNOWLEDGE message is NGAP HANDOVER REQUEST ACKNOWLEDGE message in the present embodiment. For a bearer that performs data forwarding in a node (i.e. the base station) internal way or a bearer that has been configured on the secondary base station before the handover, the target node gNB 0 does not need to include the transport layer address and tunnel identifier of the bearer for data forwarding in the HANDOVER REQUEST ACKNOWLEDGE message. The target base station gNB 0 sends the allocated tunnel information corresponding to each E-RAB to the AMF.

Step 605: The AMF sends a seventh message to the MME. The seventh message may be a FORWARD RELOCATION RESPONSE message. The FORWARD RELOCATION RESPONSE message is GTP FORWARD RELOCATION RESPONSE message in the present embodiment.

Step 606: The MME sends an eighth message to the source node eNB 1. The eighth message may be a HANDOVER COMMAND message. The HANDOVER COMMAND message is S1AP HANDOVER COMMAND message in the present embodiment.

The method can simplify the data forwarding process in the handover process. The above technical scheme is described in a scenario where the secondary base station serving the UE before the handover and the target base station are logically the same entity in the fourth embodiment. However, the above technical scheme is not limited thereto. In addition, the above technical scheme is also applicable to a scenario where the secondary base station serving the UE before the handover and the target base station are co-located nodes. Compared with other technical schemes, the above technical schemes can all simplify the processing procedure of the target base station by sending a UE identifier and/or a secondary base station identifier.

Figure 7:
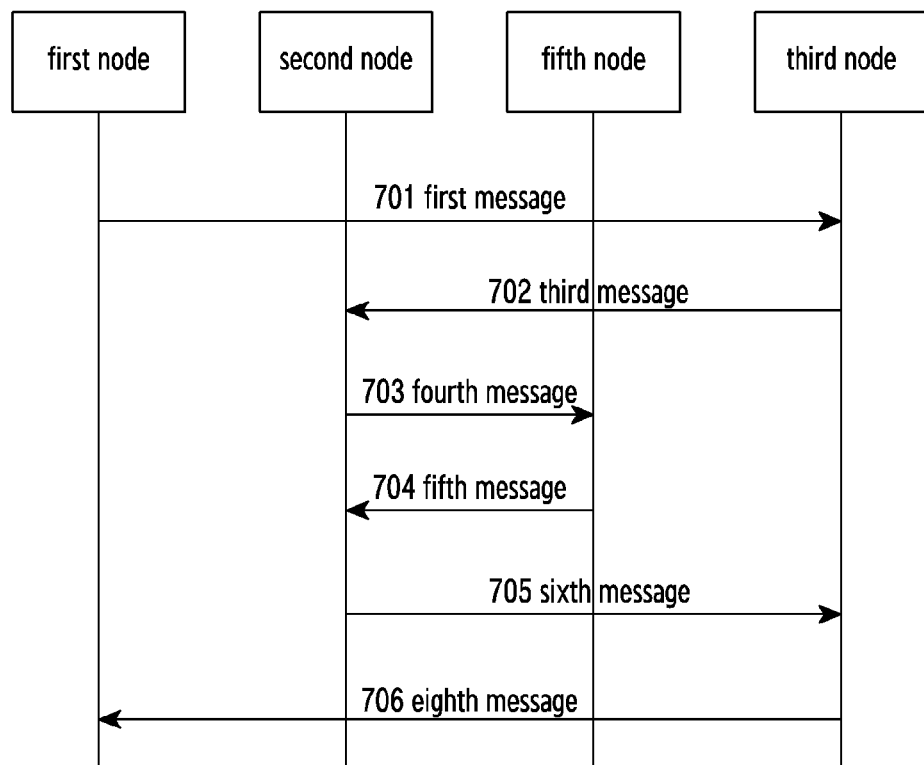
FIG. 7 shows a handover method.

FIG. 7 is a schematic diagram of a fifth embodiment. The fifth embodiment describes a handover method.

In a fifth embodiment, the handover method includes the following steps:

Step 701: A first node sends a first message to a third node, the first message carries UE identification information and secondary node identification information which is the identification information of a fifth node.

Step 702: The third node sends a third message to a second node, and the third message carries the UE identification information and the secondary node identification information in the first message.

Step 703: The second node sends a fourth message to the fifth node, the fourth message carries the UE identification information in the third message and the information indicating that a secondary node is added.

Step 704: The fifth node sends a fifth message to the second node, and confirms that the fifth node may continue to serves as a secondary node after the handover.

Step 705: The second node sends a sixth message to the third node, and the sixth message carries information indicating that the secondary node remains unchanged before and after the handover.

Step 706: The third node sends an eighth message to the first node, and the eighth message carries the information indicating that the secondary node remains unchanged before and after the handover in the sixth message.

Figure 8:
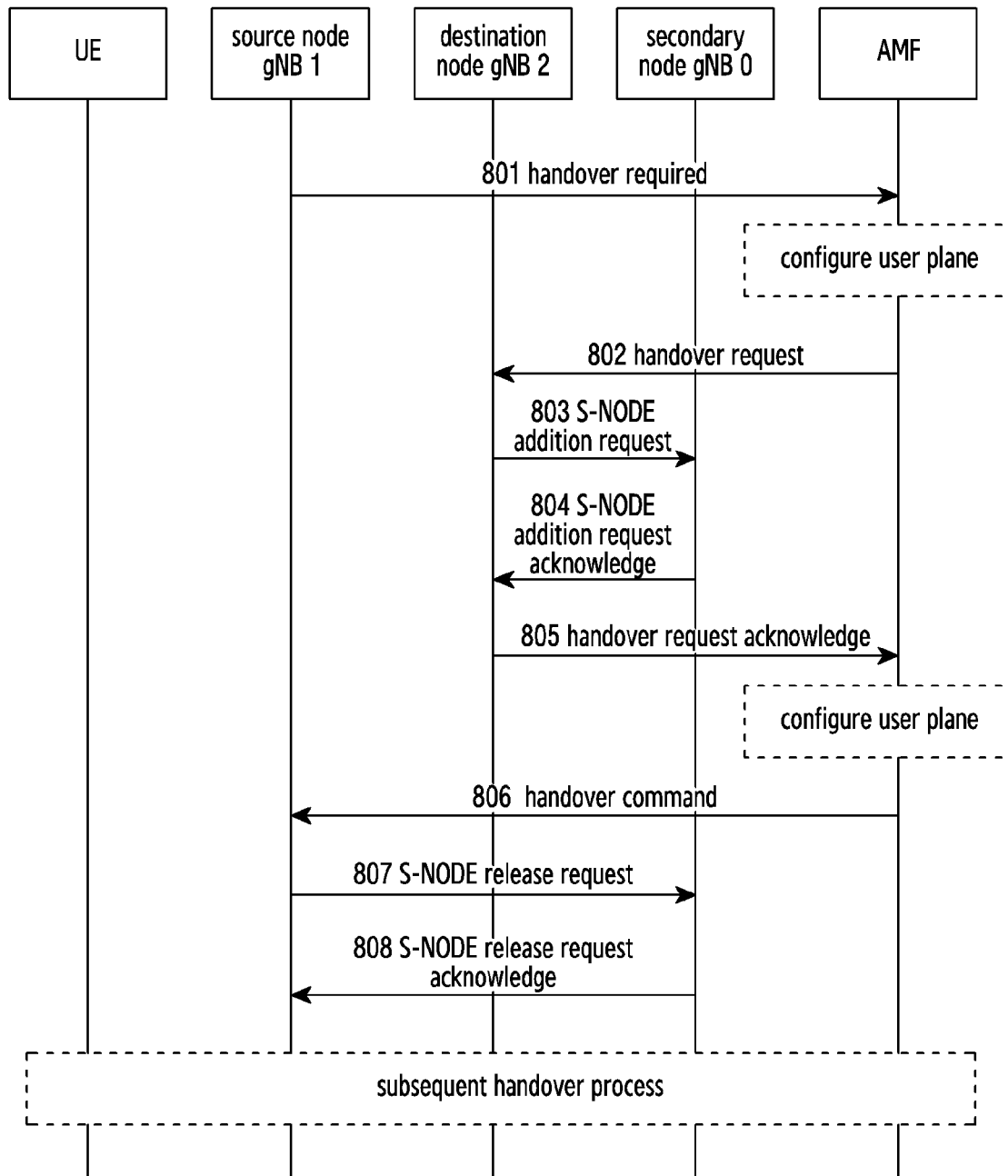
FIG. 8 shows a specific example of applying the handover method shown in FIG. 7 to an intra-system handover scenario of a 5G communication system.

FIG. 8 is a schematic diagram of a sixth embodiment. The sixth embodiment is one specific example of applying the handover method in the fifth embodiment to an intra-system handover scenario of a 5G communication system.

In the sixth embodiment, before the intra-system handover is performed, the UE is in a dual connectivity state and connected to the master node gNB 1 and the secondary node gNB 0 at the same time; after the intra-system handover is performed, the UE is still in the dual connectivity state and connected to the master node gNB 2 and the secondary node gNB 0 that remains unchanged before and after the handover at the same time. It can be seen that, in the sixth embodiment, the gNB 1 is a source node, the gNB 2 is a target node, and the secondary node before and after the handover remain unchanged as the gNB 0. Wherein, the source node gNB 1 and the target node gNB 2 are both connected to the AMF.

The source node gNB 1 may correspond to the first node in the fifth embodiment, the target node gNB 2 may correspond to the second node in the fifth embodiment, the secondary node gNB 0 may correspond to the fifth node in the fifth embodiment, and the AMF may correspond to the third node in the fifth embodiment.

In the above intra-system handover scenario of the 5G communication system, the handover method includes the following steps:

Step 801: The source node gNB 1 sends a first message to the AMF. The first message may be a HANDOVER REQUIRED message. The HANDOVER REQUIRED message is NGAP HANDOVER REQUIRED message in the present embodiment. The HANDOVER REQUIRED message carries UE identification information and identification information of the secondary node gNB 0.

Specifically, the HANDOVER REQUIRED message may carry a Source to Target Transparent Container field which may carry a Source NG-RAN Node to Target NG-RAN Node Transparent Container field. The Source NG-RAN Node to Target NG-RAN Node Transparent Container field carries the UE identification information and the identification information of the secondary node gNB 0. Alternatively, the HANDOVER REQUIRED message may directly include information elements for indicating the UE identification information and the identification information of the secondary node gNB 0, so as to directly carry the UE identification information and the identification information of the secondary node gNB 0.

Specifically, the UE identification information may be a UE identifier S-NG-RAN node UE XnAP ID assigned by the secondary node gNB 0 to the UE on the interface Xn. Alternatively, the UE identification information may be an identifier C-RNTI assigned by the secondary node gNB 0 to the UE. When the UE identification information is the C-RNTI, the HANDOVER REQUIRED message further needs to include a PScell ID of the UE at the secondary node gNB 0 and/or the secondary node identification information of the gNB 0.

Step 802: The AMF sends a third message to the target node gNB 2. The third message may be a HANDOVER REQUEST message. The HANDOVER REQUEST message is NGAP HANDOVER REQUEST message in the present embodiment. The HANDOVER REQUEST message carries the UE identification information and the identification information of the secondary node gNB 0 in the HANDOVER REQUIRED message.

Specifically, the AMF may transparently forward the content of the Source to Target Transparent Container field it receives to the target node gNB 2. Alternatively, in step 801, if the HANDOVER REQUIRED message directly carries the UE identification information and the identification information of the secondary node gNB 0, the HANDOVER REQUEST message should also directly carry the UE identification information and the identification information of the secondary node gNB 0.

The above scheme may be advantageous. Specifically, the target node gNB 2 will determine whether the secondary node gNB 0 is able to remain unchanged as a secondary node after the handover according to the received identification information of the secondary node gNB 0. Therefore, the secondary node identification information makes it possible for the secondary node gNB 0 before the handover to remain unchanged after the handover is completed, providing the possibility of avoiding unnecessary forwarding.

Step 803: The target node gNB 2 sends a fourth message to the secondary node gNB 0. The fourth message may be a secondary node addition request message which may be an XnAPS-NODE ADDITION REQUEST message in the present embodiment. The S-NODE ADDITION REQUEST message includes the UE identification information and/or an S-NODE Addition Trigger Indication field. The S-NODE Addition Trigger Indication field indicates that the trigger scenario for the current secondary node addition preparation process is an inter-NGRAN node handover, that is, the S-NODE Addition Trigger Indication field takes a value of inter-NGRAN HO.

In the above step, when the UE identification information is the C-RNTI, the above message carrying the UE identification information also carries the PScell ID of the UE at the secondary node gNB 0 or the identification information of the secondary node gNB 0.

The above scheme may be advantageous. Specifically, the inter-NGRAN node handover is explicitly defined as a trigger scenario for the secondary node addition preparation process.

Similarly, the S-NODE Addition Trigger Indication field can also take a value of intra-NGRAN HO, so that the intra-NGRAN node handover can also be explicitly defined as a trigger scenario for the secondary node addition preparation process.

Step 804: The secondary node gNB 0 sends a fifth message to the target node gNB 2. The fifth message may be a secondary node addition request acknowledge message. The secondary node addition request acknowledge message may be an XnAPS-NODE ADDITION REQUEST ACKNOWLEDGE message in the present embodiment. The S-NODE ADDITION REQUEST ACKNOWLEDGE message carries an RRC Config Indication field.

The above scheme may be advantageous. Specifically, for the downlink data of the UE that has been transmitted to the secondary node gNB 0 but has not been transmitted to the UE before the handover is completed, since the secondary node gNB 0 is used as a secondary node before the handover, the secondary node gNB 0 may find the context of the UE that has been established on the secondary node gNB 0 according to the UE identification information, and the secondary node gNB 0 does not need to perform data forwarding before and after handover as in the existing mechanism. When the UE identifier is the C-RNTI, the secondary base station finds the context of the UE at the gNB 0 according to the PScell ID of the UE at the secondary node gNB 0 and/or the secondary node identification information of the gNB 0 and the UE identifier C-RNTI.

Step 805: The target node gNB 2 sends a sixth message to the AMF. The sixth message may be a HANDOVER REQUEST ACKNOWLEDGE message. The HANDOVER REQUEST ACKNOWLEDGE message is NGAP HANDOVER REQUEST ACKNOWLEDGE message in the present embodiment. The HANDOVER REQUEST ACKNOWLEDGE message may carry a Target To Source Transparent Container field which may carry a Target NG-RAN Node to Source NG-RAN Node Transparent Container field. The Target NG-RAN Node to Source NG-RAN Node Transparent Container field may carry a UE Context Kept Indicator field to indicate whether the context of the UE already existing on the secondary node gNB 0 is to be kept after the handover is ended. Alternatively, the HANDOVER REQUEST ACKNOWLEDGE message may directly include a UE Context Kept Indicator field to directly carry information about whether the context of the UE already existing on the secondary node gNB 0 is to be kept after the handover is ended.

Step 806: The AMF sends an eighth message to the source node gNB 1. The eighth message may be a HANDOVER COMMAND message. The HANDOVER COMMAND message is NGAP HANDOVER COMMAND message in the present embodiment. The HANDOVER COMMAND message carries a UE Context Kept Indicator field.

Specifically, the AMF may transparently forward the content of the Target To Source Transparent Container field it receives to the source node gNB 1. Alternatively, in step 805, if the HANDOVER REQUEST ACKNOWLEDGE message directly carries the UE Context Kept Indicator field, the HANDOVER COMMAND message should also directly carry the UE Context Kept Indicator field.

Step 807: The source node gNB 1 sends a ninth message to the secondary node gNB 0. The ninth message may be a secondary node release request message. The secondary node release request message may be an XnAPS-NODE RELEASE REQUEST message in the present embodiment. The S-NODE RELEASE REQUEST message includes a UE Context Kept Indicator field.

The above scheme may be advantageous. Specifically, the secondary node gNB 0 will determine, according to the UE Context Kept Indicator field, whether the context of the UE already existing thereon is to be kept after the handover is ended. Therefore, the data about the UE at the secondary node 0 can be prevented from being deleted erroneously or unnecessarily.

Step 808: The secondary node gNB 0 sends a tenth message to the source node gNB 1. The tenth message may be a secondary node release request acknowledge message. The secondary node release request acknowledge message may be an XnAPS-NODE RELEASE REQUEST ACKNOWLEDGE message in the present embodiment.

Figure 9:
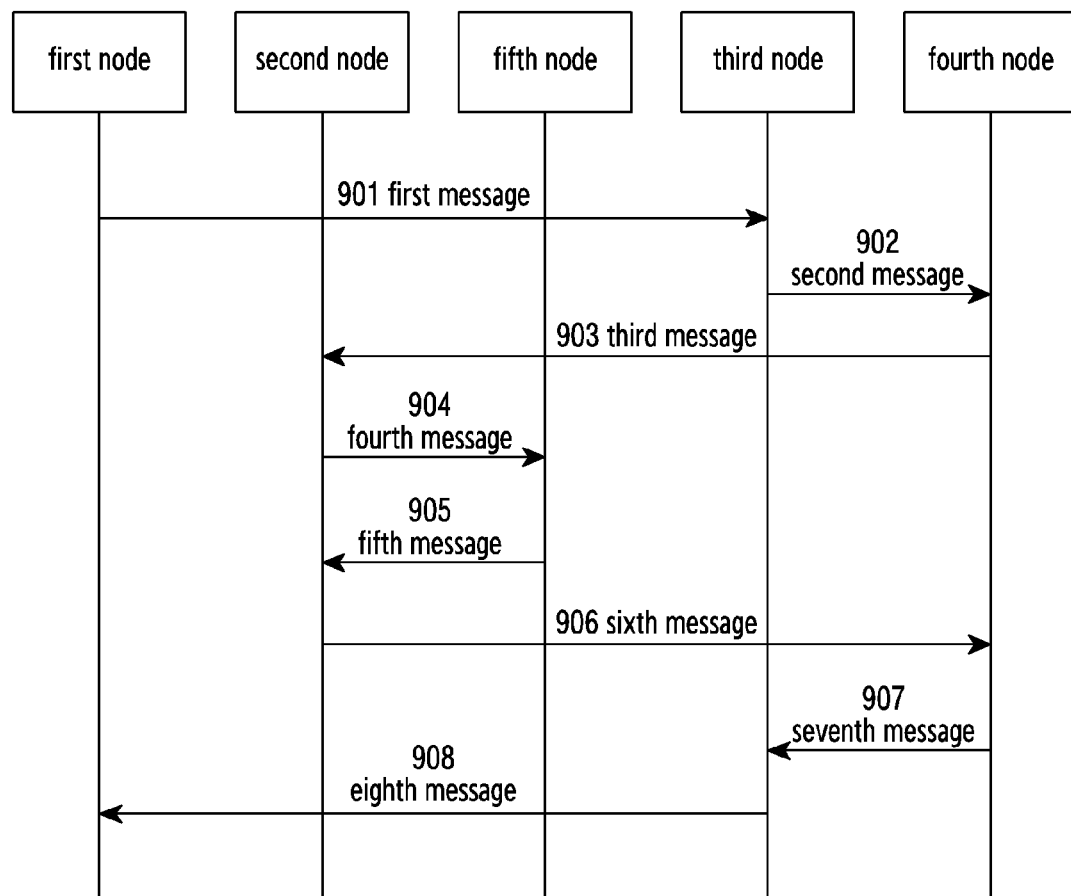
FIG. 9 shows a handover method.

FIG. 9 is a schematic diagram of a seventh embodiment. The seventh embodiment describes a handover method.

In the seventh embodiment, the handover method includes the following steps:

Step 901: A first node sends a first message to a third node. The first message carries UE identification information and secondary node identification information which is the identification information of the fifth node.

Step 902: The third node sends a second message to a fourth node, and the second message carries the UE identification information and the secondary node identification information in the first message.

Step 903: The fourth node sends a third message to a second node, and the third message carries the UE identification information and the secondary node identification information in the second message.

Step 904: The second node sends a fourth message to the fifth node, and the fourth message carries the UE identification information in the third message and scenario information indicating that a secondary node is currently added.

Step 905: The fifth node sends a fifth message to the second node, and confirms that the fifth node can continue to be a secondary node after the handover.

Step 906: The second node sends a sixth message to the fourth node, and the sixth message carries information indicating that the secondary node remains unchanged before and after the handover.

Step 907: The fourth node sends a seventh message to the third node, and the seventh message carries the information indicating that the secondary node remains unchanged before and after the handover in the sixth message.

Step 908: The third node sends an eighth message to the first node, and the eighth message carries the information indicating that the secondary node remains unchanged before and after the handover in the seventh message.

Figure 10:
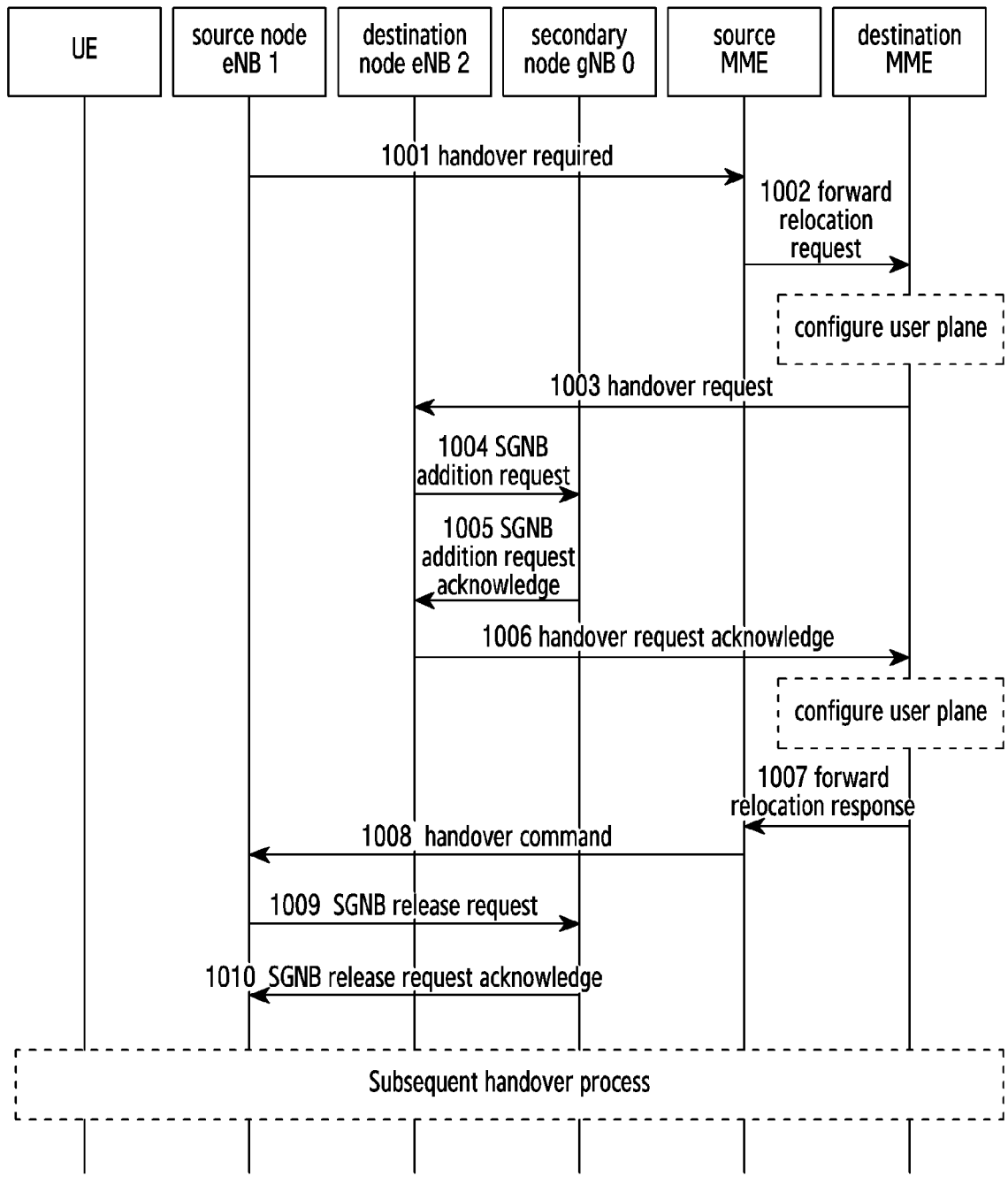
FIG. 10 shows a specific example of applying the handover method shown in FIG. 9 to an intra-system handover scenario of an EPS communication system.

FIG. 10 is a schematic diagram of an eighth embodiment. The eighth embodiment is one specific example of applying the handover method in the seventh embodiment to an intra-system handover scenario of an EPS communication system.

In the eighth embodiment, before the intra-system handover is performed, the UE is in a dual connectivity state and is connected to the master node eNB 1 and the secondary node gNB 0 at the same time; after the intra-system handover based on the interface S1 is performed by the UE, the UE is still in the dual connectivity state and is connected to the master node eNB 2 and the secondary node gNB 0 that remains unchanged before and after the handover at the same time. It can be seen that, in the eighth embodiment, eNB 1 is a source node, eNB 2 is a target node, and the secondary node before and after the handover remains unchanged as gNB 0. Wherein, the source node eNB 1 is connected to the source MME, and the target node eNB 2 is connected to the target MME.

The source node eNB 1 may correspond to the first node in the seventh embodiment, the target node eNB 2 may correspond to the second node in the seventh embodiment, the source MME may correspond to the third node in the seventh embodiment, the target MME may correspond to the fourth node in the seventh embodiment, and the secondary node gNB 0 may correspond to the fifth node in the seventh embodiment.

In the above intra-system handover scenario of the EPS communication system, the handover method includes the following steps:

Step 1001: The source node eNB sends a first message to the source MME. The first message may be a HANDOVER REQUIRED message. The HANDOVER REQUIRED message is S1AP HANDOVER REQUIRED message in the present embodiment. The HANDOVER REQUIRED message carries UE identification information and the identification information of the secondary node gNB 0.

Specifically, the HANDOVER REQUIRED message carries a Source to Target Transparent Container field which may carry a Source eNB to Target eNB Transparent Container field. The Source eNB to Target eNB Transparent Container field carries the UE identification information and the identification information of the secondary node gNB 0. Alternatively, the HANDOVER REQUIRED message may directly include information elements for indicating the UE identification information and the identification information of the secondary node gNB 0, so as to directly carry the UE identification information and the identification information of the secondary node gNB 0.

Specifically, the UE identification information may be a UE identifier SgNB UE X2AP ID assigned by the secondary node gNB 0 to the UE over X2 interface. Alternatively, the UE identification information may be an identifier C-RNTI assigned by the secondary node gNB 0 to the UE. When the UE identification information is the C-RNTI, the HANDOVER REQUIRED message further needs to include a PScell ID of the UE at the secondary node gNB 0 or the secondary node identification information of the gNB 0.

Step 1002: The source MME sends a second message to the target MME. The second message may be a FORWARD RELOCATION REQUEST message. The FORWARD RELOCATION REQUEST message is GTP FORWARD RELOCATION REQUEST message in the present embodiment. The FORWARD RELOCATION REQUEST message carries the UE identification information and the identification information of the secondary node gNB 0 in the HANDOVER REQUIRED message.

Specifically, the source MME transparently forwards the content of the Source to Target Transparent Container field it receives to the target MME. Alternatively, in step 1001, if the UE identification information and the identification information of the secondary node gNB 0 are directly carried by the HANDOVER REQUIRED message, the FORWARD RELOCATION REQUEST message of GTP control plane protocol signaling should also directly carry the UE identification information and the identification information of the secondary node gNB 0.

Step 1003: The target MME sends a third message to the target node eNB 2. The third message may be a HANDOVER REQUEST message. The HANDOVER REQUEST message is S1AP HANDOVER REQUEST message in the present embodiment. The HANDOVER REQUEST message carries the UE identification information and the identification information of the secondary node gNB 0 in the HANDOVER REQUIRED message.

Specifically, the target MME transparently forwards the content of the Source to Target Transparent Container field it receives to the target node eNB 2. Alternatively, in step 1002, if the UE identification information and the identification information of the secondary node gNB 0 are directly carried by the FORWARD RELOCATION REQUEST message, the HANDOVER REQUEST message should also directly carry The UE identification information and the identification information of the secondary node gNB 0.

The above scheme may be advantageous. Specifically, the target node eNB 2 will determine whether the secondary node gNB 0 is able to remain unchanged as a secondary node after the handover according to the received identification information of the secondary node gNB 0. Therefore, the secondary node identification information makes it possible for the secondary node gNB 0 before the handover to be maintained after the handover is completed, providing the possibility of avoiding unnecessary forwarding.

Step 1004: The target node eNB 2 sends a fourth message to the secondary node gNB 0. The fourth message may be a secondary node addition request message which includes the UE identification information and/or a secondary node addition trigger indication. The secondary node addition request message may be an X2AP SGNB ADDITION REQUEST message in the present embodiment. The SGNB ADDITION REQUEST message includes the UE identification information and/or an SGNB Addition Trigger Indication field. The SGNB Addition Trigger Indication field indicates that the trigger scenario for the current secondary node addition preparation process is an inter-eNB handover, that is, the SGNB Addition Trigger Indication field takes a value of inter-eNB HO.

In the above step, when the UE identification information is the C-RNTI, the message carrying the UE identification information also carries the PScell ID of the UE at the secondary node gNB 0 or the identification information of the secondary node gNB 0.

The above scheme may be advantageous. Specifically, the inter-eNB handover is explicitly defined as a secondary node addition preparation process trigger scenario.

Step 1005: The secondary node gNB 0 sends a fifth message to the target node eNB 2. The fifth message may be a secondary node addition request acknowledge message which may be an X2AP SGNB ADDITION REQUEST ACKNOWLEDGE message. The SGNB ADDITION REQUEST ACKNOWLEDGE message carries an RRC Config Indication field.

The above scheme may be advantageous. Specifically, for the downlink data of the UE that has been transmitted to the secondary node gNB 0 but has not been transmitted to the UE before the handover is completed, since the secondary node gNB 0 is used as a secondary node before the handover, the secondary node gNB 0 may find the context of the UE that has been established on the secondary node gNB 0 according to the UE identification information, and the secondary node gNB 0 does not need to perform data forwarding before and after handover as in the existing mechanism. When the UE identifier is the C-RNTI, the secondary base station finds the context of the UE at the gNB 0 according to the PScell ID of the UE at the secondary node gNB 0 and/or the secondary node identification information of the gNB 0 and the UE identifier C-RNTI.

Step 1006: The target node eNB sends a sixth message to the target MME. The sixth message may be a HANDOVER REQUEST ACKNOWLEDGE message. The HANDOVER REQUEST ACKNOWLEDGE message is S1AP HANDOVER REQUEST ACKNOWLEDGE message. The HANDOVER REQUEST ACKNOWLEDGE message may carry a Target To Source Transparent Container field which may carry a Target eNB to Source eNB Transparent Container field. The Target eNB to Source eNB Transparent Container field may carry a UE Context Kept Indicator field to indicate whether the context of the UE already existing on the secondary node gNB 0 is to be kept after the handover is ended. Alternatively, the HANDOVER REQUEST ACKNOWLEDGE message may directly include a UE Context Kept Indicator field to directly carry information about whether the context of the UE already existing on the secondary node gNB 0 is to be kept after the handover is ended.

Step 1007: The target MME sends a seventh message to the source MME. The seventh message may be a FORWARD RELOCATION RESPONSE message. The FORWARD RELOCATION RESPONSE message is GTP FORWARD RELOCATION RESPONSE message.

The FORWARD RELOCATION RESPONSE message carries the UE Context Kept Indicator in the HANDOVER REQUEST ACKNOWLEDGE message.

Specifically, the target MME may transparently forward the content of the Target To Source Transparent Container field it receives to the source MME. Alternatively, in step 1006, if the HANDOVER REQUEST ACKNOWLEDGE message directly carries the UE Context Kept Indicator field, the FORWARD RELOCATION RESPONSE message of GTP control plane protocol signaling should also directly carry the UE Context Kept Indicator field.

Step 1008: The source MME sends an eighth message to the source node eNB 1. The eighth message may be a HANDOVER COMMAND message. The HANDOVER COMMAND message is S1AP HANDOVER COMMAND message. The HANDOVER COMMAND message carries a UE Context Kept Indicator field.

Specifically, the source MME may transparently forward the content of the Target To Source Transparent Container field it receives to the source node eNB1. Alternatively, in step 1007, if the FORWARD RELOCATION RESPONSE message directly carries the UE Context Kept Indicator field, the HANDOVER COMMAND message should also directly carry the UE Context Kept Indicator field.

Step 1009: The source node eNB 1 sends a ninth message to the secondary node gNB 0. The ninth message may be a secondary node release request message which may be an X2AP SGNB RELEASE REQUEST message. The SGNB RELEASE REQUEST message includes a UE Context Kept Indicator field.

The above scheme may be advantageous. Specifically, the secondary node gNB 0 will determine, according to the UE Context Kept Indicator field, whether the context of the UE already existing thereon is to be kept after the handover is ended. Therefore, the data about the UE at the secondary node 0 can be prevented from being deleted erroneously or unnecessarily.

Step 1010: The secondary node gNB 0 sends a tenth message to the source node eNB 1. The tenth message may be a secondary node release request acknowledge message which may be an X2AP SGNB RELEASE REQUEST ACKNOWLEDGE message.

Figure 11:
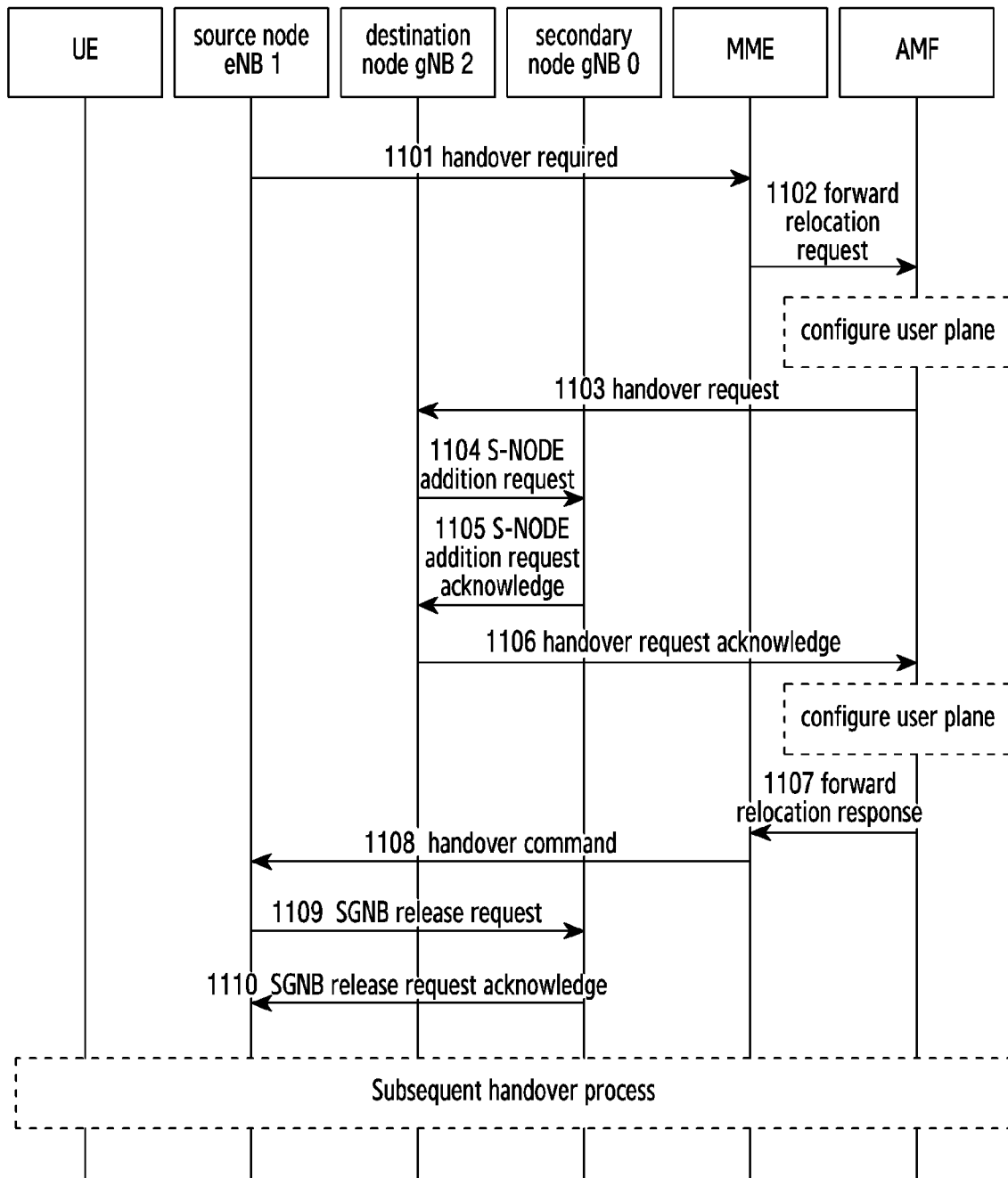
FIG. 11 shows a specific example of applying the handover method shown in FIG. 9 to an inter-system handover scenario from an EPS to a 5G communication system.

FIG. 11 is a schematic diagram of a ninth embodiment. The ninth embodiment is one specific example of applying the handover method in the seventh embodiment to a handover scenario from an EPS communication system to a 5G communication system.

In the ninth embodiment, before the inter-system handover is performed, the UE is in a dual connectivity state and is simultaneously connected to the master node eNB 1 and the secondary node gNB 0; after the UE performs a handover from the EPS system to the 5G system, the UE is still in a dual connectivity state and is connected to the master node gNB 2 and the secondary node gNB 0 that remains unchanged before and after the handover at the same time. It can be seen that, in the ninth embodiment, eNB 1 is a source node, gNB 2 is a target node, and the secondary node before and after the handover remains unchanged as gNB 0. The source node eNB 1 is connected to the MME, and the target node gNB 2 is connected to the AMF.

The source node eNB 1 may correspond to the first node in the seventh embodiment, the target node gNB 2 may correspond to the second node in the seventh embodiment, the MME may correspond to the third node in the seventh embodiment, the AMF may correspond to the fourth node in the seventh embodiment, and the secondary node gNB 0 may correspond to the fifth node in the seventh embodiment.

In the above handover scenario from the EPS communication system to the 5G communication system, the handover method includes the following steps:

Step 1101: The source node eNB sends a first message to the MME. The first message may be a HANDOVER REQUIRED message. The HANDOVER REQUIRED message is S1AP HANDOVER REQUIRED message. The HANDOVER REQUIRED message carries UE identification information and identification information of the secondary node gNB 0.

Specifically, the HANDOVER REQUIRED message carries a Source to Target Transparent Container field which may carry a Source NG-RAN Node to Target NG-RAN Node Transparent Container field. The Source NG-RAN Node to Target NG-RAN Node Transparent Container field carries the UE identification information and the identification information of the secondary node gNB 0. Alternatively, the HANDOVER REQUIRED message may directly include information elements for indicating the UE identification information and the identification information of the secondary node gNB 0, so as to directly carry the UE identification information and the identification information of the secondary node gNB 0.

Specifically, the UE identification information may be a UE identifier SgNB UE X2AP ID assigned by the secondary node gNB 0 to the UE over X2 interface. Alternatively, the UE identification information may be an identifier C-RNTI assigned by the secondary node gNB 0 to the UE. When the UE identification information is the C-RNTI, the HANDOVER REQUIRED message further needs to include a PScell ID of the UE at the secondary node gNB 0 and/or the secondary node identification information of the gNB 0.

Step 1102: the MME sends a second message to the AMF. The second message may be a FORWARD RELOCATION REQUEST message. The FORWARD RELOCATION REQUEST message is GTP FORWARD RELOCATION REQUEST message. The FORWARD RELOCATION REQUEST message carries the UE identification information and the identification information of the secondary node gNB 0 in the HANDOVER REQUIRED message.

Specifically, the MME transparently forwards the content of the Source to Target Transparent Container field it receives to the AMF. Alternatively, in step 1101, if the UE identification information and the identification information of the secondary node gNB 0 are directly carried by the HANDOVER REQUIRED message, the FORWARD RELOCATION REQUEST message of GTP control plane protocol signaling should also directly carry the UE identification information and the identification information of the secondary node gNB 0.

Step 1103: the AMF sends a third message to the target node gNB 2. The third message may be a HANDOVER REQUEST message. The HANDOVER REQUEST message is NGAP HANDOVER REQUEST message. The HANDOVER REQUEST message carries the UE identification information and the identification information of the secondary node gNB 0 in the HANDOVER REQUIRED message.

Specifically, the AMF transparently forwards the content of the Source to Target Transparent Container field it receives to the target node gNB 2. Alternatively, in step 1102, if the UE identification information and the identification information of the secondary node gNB 0 are directly carried by the FORWARD RELOCATION REQUEST message, the HANDOVER REQUEST message of NGAP signaling should also directly carry the UE identification information and the identification information of the secondary node gNB 0.

The above scheme may be advantageous. Specifically, the target node gNB 2 will determine whether the secondary node gNB 0 is able to remain unchanged as a secondary node after the handover according to the received identification information of the secondary node gNB 0. Therefore, the identification information of the secondary node makes it possible for the secondary node gNB 0 before the handover to be maintained after the handover is completed, providing the possibility of avoiding unnecessary forwarding.

Step 1104: The target node gNB 2 sends a fourth message to the secondary node gNB 0. The fourth message may be a secondary node addition request message which includes the UE identification information and/or a secondary node addition trigger indication. The secondary node addition request message may be an XnAPS-NODE ADDITION REQUEST message. The S-NODE ADDITION REQUEST message includes the UE identification information and/or an S-NODE Addition Trigger Indication field. The S-NODE Addition Trigger Indication field indicates that the trigger scenario for the current secondary node addition preparation process is an eNB-NGRAN handover, that is, the S-NODE Addition Trigger Indication field takes a value of eNB-NGRAN HO.

In the above step, when the UE identification information is the C-RNTI, the message carrying the UE identification information also carries the PScell ID of the UE at the secondary node gNB 0 or the identification information of the secondary node gNB 0.

The above scheme may be advantageous. Specifically, the eNB-NGRAN handover is explicitly defined as a trigger scenario for the secondary node addition preparation process.

Step 1105: The secondary node gNB 0 sends a fifth message to the target node gNB 2. The fifth message may be a secondary node addition request acknowledge message which may be an XnAPS-NODE ADDITION REQUEST ACKNOWLEDGE message. The S-NODE ADDITION REQUEST ACKNOWLEDGE message carries an RRC Config Indication field.

The above scheme may be advantageous. Specifically, for the downlink data of the UE that has been transmitted to the secondary node gNB 0 but has not been transmitted to the UE before the handover is completed, since the secondary node gNB 0 is used as a secondary node before the handover, the secondary node gNB 0 may find the context of the UE that has been established on the secondary node gNB 0 according to the UE identification information, and the secondary node gNB 0 does not need to perform data forwarding before and after handover as in the existing mechanism. When the UE identifier is the C-RNTI, the secondary node base station finds the context of the UE at the gNB 0 according to the PScell ID of the UE at the secondary node gNB 0 and/or the secondary node identification information of the gNB 0 and the UE identifier C-RNTI.

Step 1106: The target node gNB 2 sends a sixth message to the AMF. The sixth message may be a HANDOVER REQUEST ACKNOWLEDGE message. The HANDOVER REQUEST ACKNOWLEDGE message is NGAP HANDOVER REQUEST ACKNOWLEDGE message. The HANDOVER REQUEST ACKNOWLEDGE message may carry a Target To Source Transparent Container field which may carry a Target NG-RAN Node to Source NG-RAN Node Transparent Container field. The Target NG-RAN Node to Source NG-RAN Node Transparent Container field may carry a UE Context Kept Indicator field to indicate whether the context of the UE already existing on the secondary node gNB 0 is to be kept after the handover is ended. Alternatively, the HANDOVER REQUEST ACKNOWLEDGE message may directly include a UE Context Kept Indicator field to directly carry information about whether the context of the UE already existing on the secondary node gNB 0 is to be kept after the handover is ended.

Step 1107: The AMF sends a seventh message to the MME. The seventh message may be a FORWARD RELOCATION REQUEST message. The FORWARD RELOCATION RESPONSE message is GTP FORWARD RELOCATION REQUEST message.

The FORWARD RELOCATION RESPONSE message carries the UE Context Kept Indicator in the HANDOVER REQUEST ACKNOWLEDGE message.

Specifically, the AMF transparently forwards the content of the Target To Source Transparent Container field it receives to the MME. Alternatively, in step 1106, if the HANDOVER REQUEST ACKNOWLEDGE message directly carries the UE Context Kept Indicator field, the FORWARD RELOCATION RESPONSE message of GTP control plane protocol signaling should also directly carry the UE Context Kept Indicator field.

Step 1108: The MME sends an eighth message to the source node eNB 1. The eighth message may be a HANDOVER COMMAND message. The HANDOVER COMMAND message is S1AP HANDOVER COMMAND message. The HANDOVER COMMAND message carries a UE Context Kept Indicator field.

Specifically, the MME may transparently forward the content of the Target To Source Transparent Container sub-segment it receives to the source node eNB1. Alternatively, in step 1107, if the FORWARD RELOCATION RESPONSE message directly carries the UE Context Kept Indicator field, the HANDOVER COMMAND message should also directly carry the field UE Context Kept Indicator.

Step 1109: The source node eNB 1 sends a ninth message to the secondary node gNB 0. The ninth message may be a secondary node release request message which may be an X2AP SGNB RELEASE REQUEST message. The SGNB RELEASE REQUEST message includes a UE Context Kept Indicator field.

The above scheme may be advantageous. Specifically, the secondary node gNB 0 will determine, according to the UE Context Kept Indicator field, whether the context of the UE already existing thereon is to be kept after the handover is ended. Therefore, the data about the UE at the secondary node 0 can be prevented from being deleted erroneously or unnecessarily.

Step 1110: The secondary node gNB 0 sends a tenth message to the source node eNB 1. The tenth message may be a secondary node release request acknowledge message which may be an X2AP SGNB RELEASE REQUEST ACKNOWLEDGE message.

Figure 12:
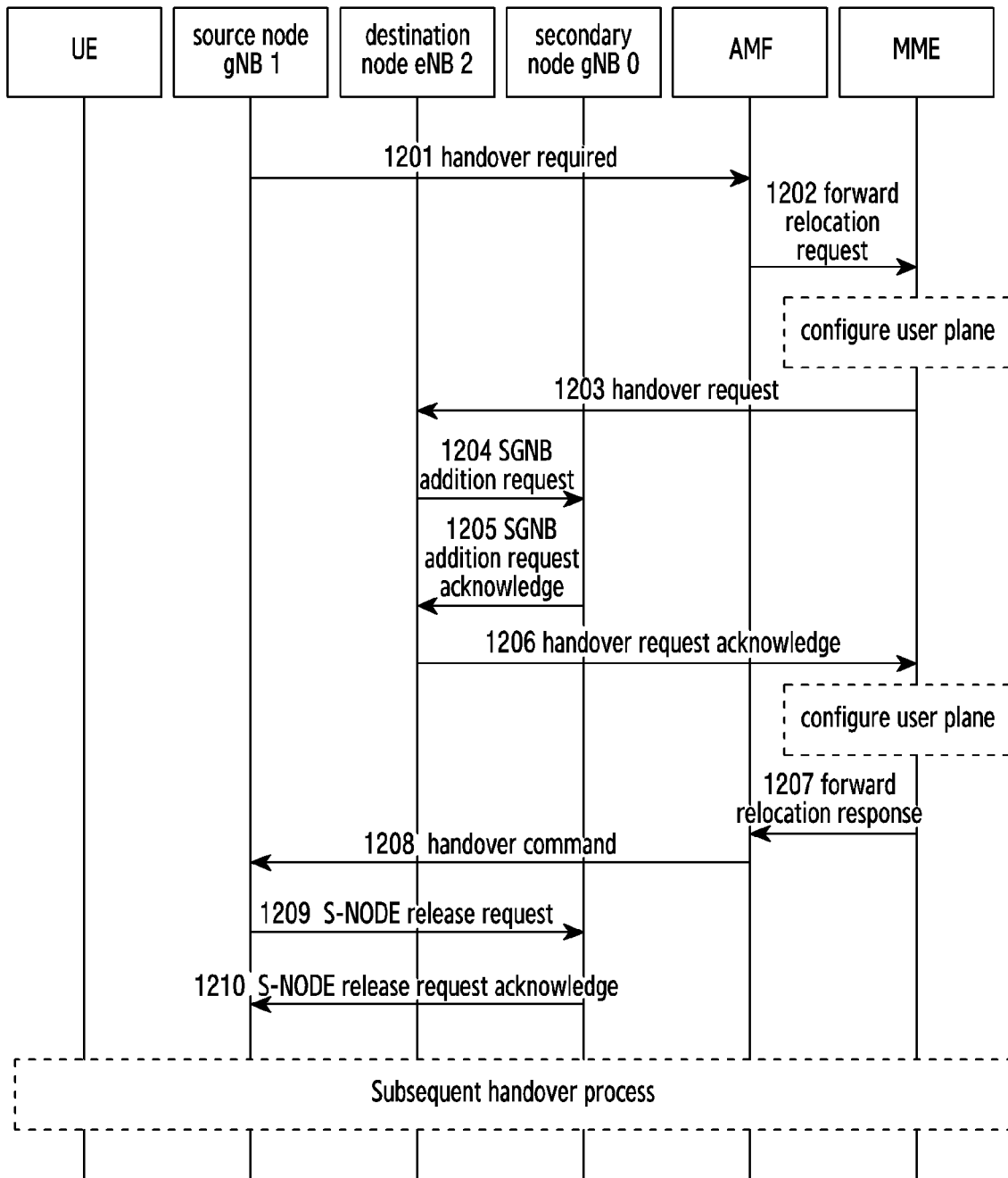
FIG. 12 shows a specific example of applying the handover method shown in FIG. 9 to an inter-system handover scenario from a 5G to an EPS communication system.

FIG. 12 is a schematic diagram of a tenth embodiment. The tenth embodiment is one specific example of applying the handover method in the seventh embodiment to a handover scenario between a 5G communication system and an EPS communication system.

In the tenth embodiment, before the inter-system handover is performed, the UE is in a dual connectivity state and is connected to the master node gNB 1 and the secondary node gNB 0 at the same time; after the UE performs a handover from the 5G system to the EPS system, the UE is still in a dual connectivity state and is connected to the master node eNB 2 and the secondary node gNB 0 that remains unchanged before and after the handover at the same time. It can be seen that, in the tenth embodiment, gNB 1 is a source node, eNB 2 is a target node, and the secondary node before and after the handover remains unchanged as gNB 0. The source node gNB 1 is connected to the AMF, and the target node gNB 2 is connected to the MME.

The source node gNB 1 may correspond to the first node in the seventh embodiment, the target node eNB 2 may correspond to the second node in the seventh embodiment, the AMF may correspond to the third node in the seventh node, the MME may correspond to the fourth node in the seventh embodiment, and the secondary node gNB 0 may correspond to the fifth node in the seventh embodiment.

In the above handover scenario from the 5G communication system to the EPS communication system, the handover method includes the following steps:

Step 1201: The source node gNB 1 sends a first message to the AMF. The first message may be a HANDOVER REQUIRED message. The HANDOVER REQUIRED message is NGAP HANDOVER REQUIRED message. The HANDOVER REQUIRED message carries UE identification information and identification information of the secondary node gNB 0.

Specifically, the HANDOVER REQUIRED message carries a Source to Target Transparent Container field which may carry a Source eNB to Target eNB Transparent Container field. The Source eNB to Target eNB Transparent Container field carries the UE identification information and the identification information of the secondary node gNB 0. Alternatively, the HANDOVER REQUIRED message may directly include information elements for indicating the UE identification information and the identification information of the secondary node gNB 0, so as to directly carry the UE identification information and the identification information of the secondary node gNB 0.

Specifically, the UE identification information may be an identifier S-NG-RAN node UE XnAP ID assigned by the secondary node gNB 0 to the UE on the interface Xn. Alternatively, the UE identification information may be an identifier C-RNTI assigned by the secondary node gNB 0 to the UE. When the UE identification information is the C-RNTI, the HANDOVER REQUIRED message further needs to include a PScell ID of the secondary node gNB 0 and/or the secondary node identification information of the gNB 0.

Step 1202: The AMF sends a second message to the MME. The second message may be a FORWARD RELOCATION REQUEST message. The FORWARD RELOCATION REQUEST message is GTP FORWARD RELOCATION REQUEST message. The FORWARD RELOCATION REQUEST message carries the UE identification information and the identification information of the secondary node gNB 0 in the HANDOVER REQUIRED message.

Specifically, the AMF transparently forwards the content of the Source to Target Transparent Container field it receives to the MME. Alternatively, in step 1201, if the UE identification information and the identification information of the secondary node gNB 0 are directly carried by the HANDOVER REQUIRED message, the FORWARD RELOCATION REQUEST message of GTP control plane protocol signaling should also directly carry the UE identification information and the identification information of the secondary node gNB 0.

Step 1203: The MME sends a third message to the target node eNB 2. The third message may be a HANDOVER REQUEST message. The HANDOVER REQUEST message is S1AP HANDOVER REQUEST message. The HANDOVER REQUEST message carries the UE identification information and the identification information of the secondary node gNB 0 in the HANDOVER REQUIRED message.

Specifically, the MME transparently forwards the content of the Source to Target Transparent Container field it receives to the target node eNB 2. Alternatively, in step 1202, if the UE identification information and the identification information of the secondary node gNB 0 are directly carried by the FORWARD RELOCATION REQUEST message, the HANDOVER REQUEST message of S1AP signaling should also directly carry the UE identification information and the identification information of the secondary node gNB 0.

The above scheme may be advantageous. Specifically, the target node eNB 2 determines whether the secondary node gNB 0 is able to remain unchanged as a secondary node after the handover according to the received identification information of the secondary node gNB 0. Therefore, the secondary node identification information makes it possible for the secondary node gNB 0 before the handover to be maintained after the handover is completed, providing the possibility of avoiding unnecessary forwarding.

Step 1204: The target node eNB 2 sends a fourth message to the secondary node gNB 0. The fourth message may be a secondary node addition request message which includes the UE identification information and/or a secondary node addition trigger indication. The secondary node addition request message may be an X2AP SGNB ADDITION REQUEST message. The SGNB ADDITION REQUEST message includes the UE identification information and/or an SGNB Addition Trigger Indication field. The SGNB Addition Trigger Indication field indicates that the trigger scenario for the current secondary node addition preparation process is an NGRAN-eNB handover, that is, the SGNB Addition Trigger Indication field takes a value of NGRAN-eNB HO.

In the above step, when the UE identification information is the C-RNTI, the message carrying the UE identification information also carries the PScell ID of the UE at the secondary node gNB 0 or the identification information of the secondary node gNB 0.

The above scheme may be advantageous. Specifically, the NGRAN-eNB handover is explicitly defined as a trigger scenario for the secondary node addition preparation process.

Step 1205: The secondary node gNB 0 sends a fifth message to the target node eNB 2. The fifth message may be a secondary node addition request acknowledge message which may be an X2AP SGNB ADDITION REQUEST ACKNOWLEDGE message. The SGNB ADDITION REQUEST ACKNOWLEDGE message carries an RRC Config Indication field.

The above scheme may be advantageous. Specifically, for the downlink data of the UE that has been transmitted to the secondary node gNB 0 but has not been transmitted to the UE before the handover is completed, since the secondary node gNB 0 is used as a secondary node before the handover, the secondary node gNB 0 may find the context of the UE that has been established on the secondary node gNB 0 according to the UE identification information, and the secondary node gNB 0 does not need to perform data forwarding before and after handover as in the existing mechanism. When the UE identifier is the C-RNTI, the secondary base station finds the context of the UE at the gNB 0 according to the PScell ID of the UE at the secondary node gNB 0 and/or the secondary node identification information of the gNB 0 and the UE identifier C-RNTI.

Step 1206: The target node eNB 2 sends a sixth message to the MME. The sixth message may be a HANDOVER REQUEST ACKNOWLEDGE message. The HANDOVER REQUEST ACKNOWLEDGE message is S1AP HANDOVER REQUEST ACKNOWLEDGE message. The HANDOVER REQUEST ACKNOWLEDGE message may carry a Target To Source Transparent Container field which may carry a Target eNB to Source eNB Transparent Container field. The Target eNB to Source eNB Transparent Container field may carry a UE Context Kept Indicator field to indicate whether the context of the UE already existing on the secondary node gNB 0 is to be kept after the handover is ended. Alternatively, the HANDOVER REQUEST ACKNOWLEDGE message may directly include a UE Context Kept Indicator field to directly carry information about whether the context of the UE already existing on the secondary node gNB 0 is to be kept after the handover is ended.

Step 1207: The MME sends a seventh message to the AMF. The seventh message may be a FORWARD RELOCATION RESPONSE message. The FORWARD RELOCATION RESPONSE message is GTP FORWARD RELOCATION RESPONSE message.

The FORWARD RELOCATION RESPONSE message carries the UE Context Kept Indicator in the HANDOVER REQUEST ACKNOWLEDGE message.

Specifically, the MME transparently forwards the content of the Target To Source Transparent Container field it receives to the AMF. Alternatively, in step 1206, if the HANDOVER REQUEST ACKNOWLEDGE message directly carries the UE Context Kept Indicator field, the FORWARD RELOCATION RESPONSE message of GTP control plane protocol signaling should also directly carry the UE Context Kept Indicator field.

Step 1208: The AMF sends an eighth message to the source node gNB 1. The eighth message may be a HANDOVER COMMAND message. The HANDOVER COMMAND message is NGAP HANDOVER COMMAND message. The HANDOVER COMMAND message carries the UE Context Kept Indicator field.

Specifically, the AMF may transparently forward the content of the Target To Source Transparent Container field it receives to the source node gNB 1. Alternatively, in step 1207, if the FORWARD RELOCATION RESPONSE message directly carries the UE Context Kept Indicator field, the HANDOVER COMMAND message should also directly carry the UE Context Kept Indicator field.

Step 1209: The source node gNB 1 sends a ninth message to the secondary node gNB 0. The ninth message may be a secondary node release request message which may be an XnAPS-NODE RELEASE REQUEST message. The S-NODE RELEASE REQUEST message includes a UE Context Kept Indicator field.

The above scheme may be advantageous. Specifically, the secondary node gNB 0 will determine, according to the UE Context Kept Indicator field, whether the context of the UE already existing thereon is to be kept after the handover is ended. Therefore, the data about the UE at the secondary node 0 can be prevented from being deleted erroneously or unnecessarily.

Step 1210: The secondary node gNB 0 sends a tenth message to the source node gNB 1. The tenth message may be a secondary node release request acknowledge message which may be an XnAPS-NODE RELEASE REQUEST ACKNOWLEDGE message.

Figure 13:
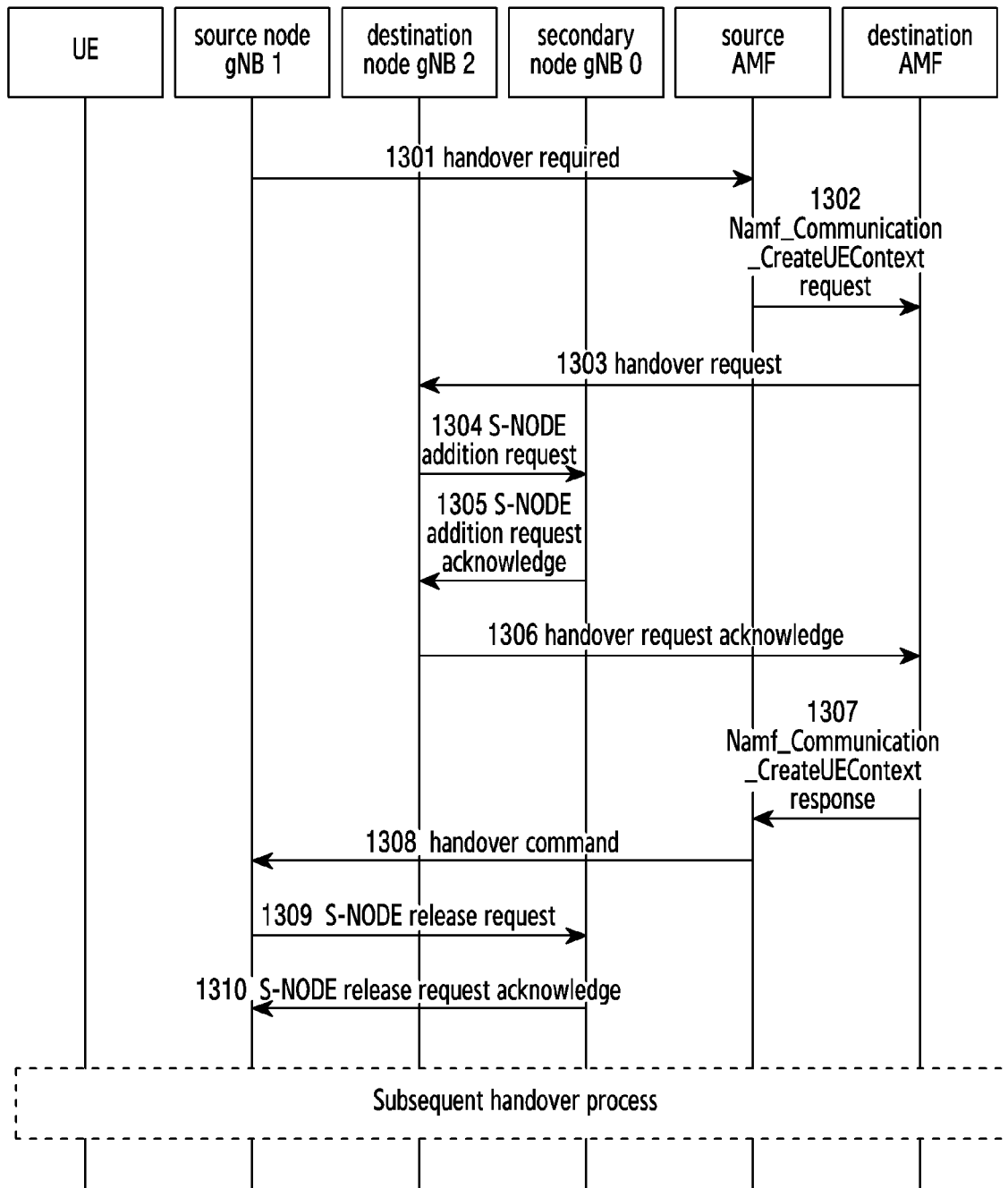
FIG. 13 shows a specific example of applying the handover method shown in FIG. 9 to an intra-system handover scenario of a 5G communication system.

FIG. 13 is a schematic diagram of an eleventh embodiment. The eleventh embodiment is one specific example of applying the handover method in the seventh embodiment to an intra-system handover scenario of a 5G communication system.

In the eleventh embodiment, before the intra-system handover is performed, the UE is in a dual connectivity state and is connected to the master node gNB 1 and the secondary node gNB 0 at the same time; after the UE performs the intra-system handover of the 5G system, the UE is still in a dual connectivity state and is connected to the master node gNB 2 and the secondary node gNB 0 that remains unchanged before and after the handover at the same time. It can be seen that, in the eleventh embodiment, gNB 1 is a source node, gNB 2 is a target node, and the secondary node before and after the handover remains unchanged as gNB 0.

The source node gNB 1 is connected to the source AMF, and the target node gNB 2 is connected to the target AMF.

The source node gNB 1 may correspond to the first node in the seventh embodiment, the target node gNB 2 may correspond to the second node in the seventh embodiment, the source AMF may correspond to the third node in the seventh embodiment, the target AMF may correspond to the fourth node in the seventh embodiment, and the secondary node gNB 0 may correspond to the fifth node in the seventh embodiment.

In the above intra-system handover scenario of the 5G communication system, the handover method includes the following steps:

Step 1301: The source node gNB 1 sends a first message to the source AMF. The first message may be a HANDOVER REQUIRED message. The HANDOVER REQUIRED message is NGAP HANDOVER REQUIRED message. The HANDOVER REQUIRED message carries UE identification information and identification information of the secondary node gNB 0.

Specifically, the HANDOVER REQUIRED message carries a Source to Target Transparent Container field which may carry a Source NG-RAN Node to Target NG-RAN Node Transparent Container field. The Source NG-RAN Node to The Target NG-RAN Node Transparent Container field carries the UE identification information and the identification information of the secondary node gNB 0. Alternatively, the HANDOVER REQUIRED message may directly include information elements for indicating the UE identification information and the identification information of the secondary node gNB 0, so as to directly carry the UE identification information and the identification information of the secondary node gNB 0.

Specifically, the UE identification information may be a UE identifier S-NG-RAN node UE XnAP ID assigned by the secondary node gNB 0 to the UE on the interface Xn. Alternatively, the UE identification information may be an identifier C-RNTI assigned by the secondary node gNB 0 to the UE. When the UE identifier is the C-RNTI, the HANDOVER REQUIRED message further needs to include a PScell ID of the UE at the secondary node gNB 0 and/or the secondary node identification information of the gNB 0.

Step 1302: The source AMF sends a second message to the target AMF. The second message may be a Namf_Communication_CreateUEContext Request message. The Namf_Communication_CreateUEContext Request message is AMF Namf_Communication_CreateUEContext Request message which carries the UE identification information and the identification information of the secondary node gNB 0 in the HANDOVER REQUIRED message.

Specifically, the source AMF transparently forwards the content of the Source to Target Transparent Container field it receives to the target AMF. Alternatively, in step 1301, if the UE identification information and the identification information of the secondary node gNB 0 are directly carried by the HANDOVER REQUIRED message, the Namf_Communication_CreateUEContext Request message of AMF interface signaling should also directly carry the UE identification information and the identification information of the secondary node gNB 0.

Step 1303: The source AMF sends a third message to the target node gNB 2. The third message may be a HANDOVER REQUEST message. The HANDOVER REQUEST message is NGAP HANDOVER REQUEST message. The HANDOVER REQUEST message carries the UE identification information and the identification information of the secondary node gNB 0 in the HANDOVER REQUIRED message.

Specifically, the AMF transparently forwards the content of the Source to Target Transparent Container field it receives to the target node gNB 2. Alternatively, in step 1302, if the UE identification information and the identification information of the secondary node gNB 0 are directly carried by the Namf_Communication_CreateUEContext Request message of AMF interface signaling, the HANDOVER REQUEST message of NGAP signaling should also directly carry the UE identification information and the identification information of the secondary node gNB 0.

The above scheme may be advantageous. Specifically, the target node gNB 2 will determine whether the secondary node gNB 0 is able to remain unchanged as a secondary node after the handover according to the received identification information of the secondary node gNB 0. Therefore, the secondary node identification information makes it possible for the secondary node gNB 0 before the handover to be maintained after the handover is completed, providing the possibility of avoiding unnecessary forwarding.

Step 1304: The target node gNB 2 sends a fourth message to the secondary node gNB 0. The fourth message may be a secondary node addition request message which includes the UE identification and/or a secondary node addition trigger indication. The secondary node addition request message may be an XnAPS-NODE ADDITION REQUEST message. The S-NODE ADDITION REQUEST message includes the UE identification information and/or an S-NODE ADDITION Trigger Indication field. The S-NODE Addition Trigger Indication field indicates that the trigger scenario for the current secondary node addition preparation process is an inter-NGRAN node handover, that is, the S-NODE Addition Trigger Indication field takes a value of inter-NGRAN HO.

In the above step, when the UE identification information is the C-RNTI, the message carrying the UE identification information also carries the PScell ID of the UE at the secondary node gNB 0 or the identification information of the secondary node gNB 0.

The above scheme may be advantageous. Specifically, the inter-NGRAN node handover is explicitly defined as a trigger scenario for the secondary node addition preparation process.

Step 1305: The secondary node gNB 0 sends a fifth message to the target node gNB 2. The fifth message may be a secondary node addition request acknowledge message which may be an XnAP S-NODE ADDITION REQUEST ACKNOWLEDGE message. The S-NODE ADDITION REQUEST ACKNOWLEDGE message carries an RRC Config Indication field.

The above scheme may be advantageous. Specifically, for the downlink data of the UE that has been transmitted to the secondary node gNB 0 but has not been transmitted to the UE before the handover is completed, since the secondary node gNB 0 is used as a secondary node before the handover, the secondary node gNB 0 may find the context of the UE that has been established on the secondary node gNB 0 according to the UE identification information, and the secondary node gNB 0 does not need to perform data forwarding before and after handover as in the existing mechanism. When the UE identifier is the C-RNTI, the secondary base station finds the context of the UE at the gNB 0 according to the PScell ID of the UE at the secondary node gNB 0 and/or the secondary node identification information of the gNB 0 and the UE identifier C-RNTI.

Step 1306: The target node gNB 2 sends a sixth message to the target AMF. The sixth message may be a HANDOVER REQUEST ACKNOWLEDGE message. The HANDOVER REQUEST ACKNOWLEDGE message is NGAP HANDOVER REQUEST ACKNOWLEDGE message. The HANDOVER REQUEST ACKNOWLEDGE message may carry a Target To Source Transparent Container field which may carry a Target NG-RAN Node to Source NG-RAN Node Transparent Container field. The Target NG-RAN Node to Source NG-RAN Node Transparent Container field may carry a UE Context Kept Indicator field to indicate whether the context of the UE already existing on the secondary node gNB 0 is to be kept after the handover is ended. Alternatively, the HANDOVER REQUEST ACKNOWLEDGE message may directly include the UE Context Kept Indicator field to directly carry information about whether the context of the UE already existing on the secondary node gNB 0 is to be kept after the handover is ended.

Step 1307: The target AMF sends a seventh message to the source AMF. The seventh message may be a Namf_Communication_CreateUEContext Response message. The Namf_Communication_CreateUEContext Response message is AMF Namf_Communication_CreateUEContext Response message which carries the UE Context Kept Indicator in the HANDOVER REQUEST ACKNOWLEDGE message.

Specifically, the target AMF transparently forwards the content of the Target To Source Transparent Container field it receives to the source AMF. Alternatively, in step 1306, if the HANDOVER REQUEST ACKNOWLEDGE message directly carries the UE Context Kept Indicator field, the Namf_Communication_CreateUEContext Response message of AMF interface signaling should also directly carry the UE Context Kept Indicator field.

Step 1308: The source AMF sends an eighth message to the source node gNB 1. The eighth message may be a HANDOVER COMMAND message. The HANDOVER COMMAND message is NGAP HANDOVER COMMAND message. The HANDOVER COMMAND message carries the UE Context Kept Indicator field.

Specifically, the source AMF can transparently forward the content of the Target To Source Transparent Container field it receives to the source node gNB 1. Alternatively, in step 1307, if the AMF interface signaling Namf_Communication_CreateUEContext Response directly carries the UE Context Kept Indicator field, the signaling HANDOVER COMMAND should also directly carry the UE Context Kept Indicator field.

Step 1309: The source node gNB 1 sends a ninth message to the secondary node gNB 0. The ninth message may be a secondary node release request message which may be an XnAP S-NODE RELEASE REQUEST message. The S-NODE RELEASE REQUEST message includes the UE Context Kept Indicator field.

The above scheme may be advantageous. Specifically, the secondary node gNB 0 will determine, according to the UE Context Kept Indicator field, whether the context of the UE already existing thereon is to be kept after the handover is ended. Therefore, the data about the UE at the secondary node 0 can be prevented from being deleted erroneously or unnecessarily.

Step 1310: The secondary node gNB 0 sends a tenth message to the source node gNB 1. The tenth message may be a secondary node release request acknowledge message which may be an XnAP S-NODE RELEASE REQUEST ACKNOWLEDGE message.

Figure 14:
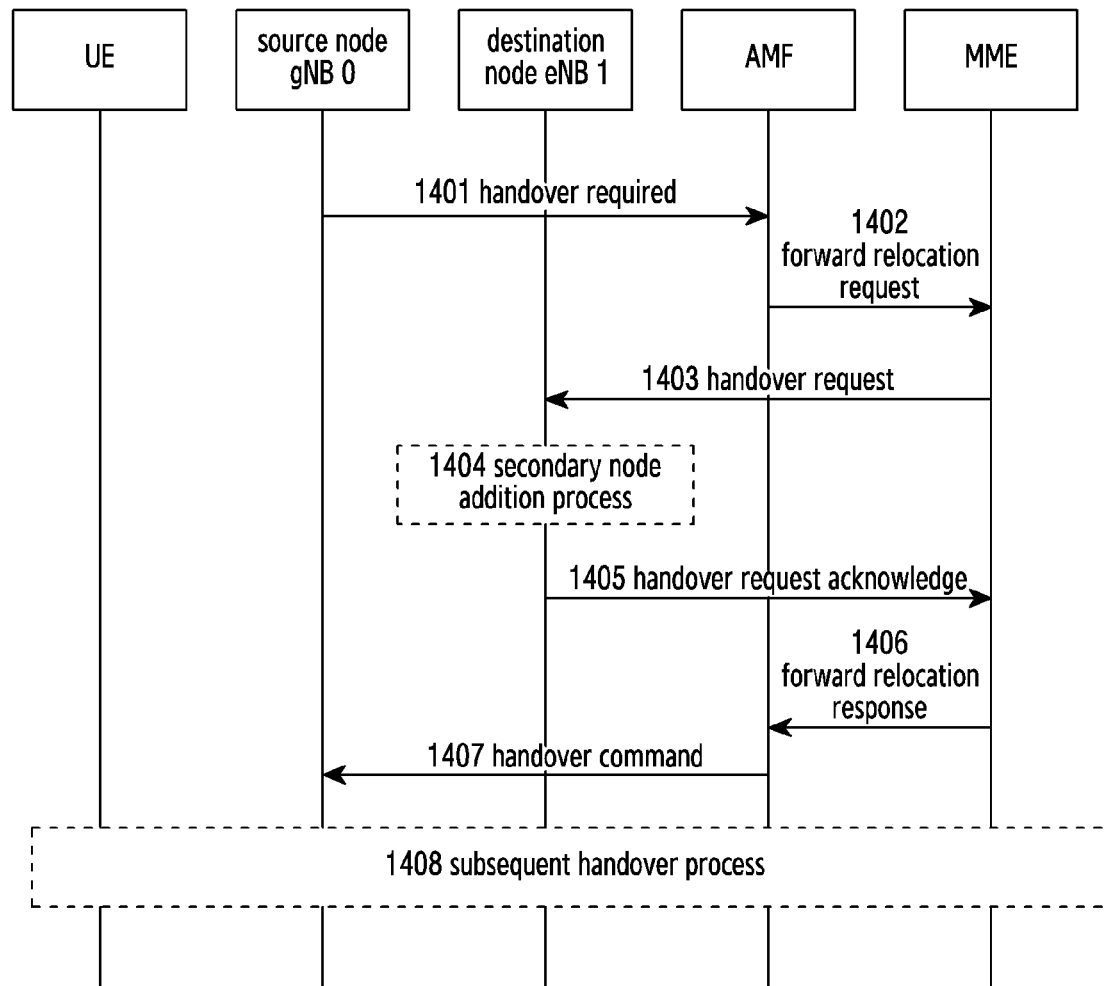
FIG. 14 shows a specific example of applying the handover method shown in FIG. 5 to an inter-system handover scenario from a 5G to an EPS communication system.

FIG. 14 is a schematic diagram of a twelfth embodiment. The twelfth embodiment is one specific example of applying the handover method in the third embodiment to an inter-system handover scenario from a 5G communication system to an EPS communication system.

In the twelfth embodiment, before the inter-system handover is performed, the UE is only connected to the gNB 0; after the inter-system handover is performed, the UE is in a dual connectivity state and is connected to the master node eNB 1 and the secondary node gNB 0 at the same time. It can be seen that, in the twelfth embodiment, the gNB 0 is a source node, the eNB 1 is a target node, and the source node is the secondary node after the handover. The source base station gNB 0 is connected to the AMF, and the target base station eNB 1 is connected to the MME.

The source node gNB 0 may correspond to the first node in the third embodiment, the target node eNB 1 may correspond to the second node in the third embodiment, the AMF may correspond to the third node in the third embodiment, and the MME may correspond to the fourth node in the third embodiment.

In the above inter-system handover scenario from the 5G communication system to the EPS system, the handover method includes the following steps:

Step 1401: The source node gNB 0 sends a first message to the AMF. The first message may be a HANDOVER REQUIRED message. The HANDOVER REQUIRED message is NGAP HANDOVER REQUIRED message in this embodiment. The HANDOVER REQUIRED message carries a source base station identifier and/or a source cell identifier and/or UE identification information and/or a measurement result of the UE.

Specifically, the HANDOVER REQUIRED message carries a Source to Target Transparent Container field. When the target node is an E-UTRAN base station, the Source to Target Transparent Container field may carry a Source eNB to Target eNB Transparent Container. The Source eNB to Target eNB Transparent Container carries the source base station identifier and/or the source cell identifier and/or the UE identification information and/or the measurement result of the UE. Alternatively, the HANDOVER REQUIRED message may directly include the source base station identifier and/or the source cell identifier and/or the UE identification information and/or the measurement result of the UE. Specifically, the UE identification information may be a C-RNTI assigned by the source node gNB 0 to the UE. In the case where the UE identifier is the C-RNTI, the identifier of the source cell also needs to be carried directly by the HANDOVER REQUIRED message or carried in the Source eNB to Target eNB Transparent Container field.

Step 1402: The AMF sends a second message to the MME. The second message may be a FORWARD RELOCATION REQUEST. The FORWARD RELOCATION REQUEST message is GTP FORWARD RELOCATION REQUEST message in this embodiment. The FORWARD RELOCATION REQUEST message carries the source base station identifier and/or the source cell identifier and/or the UE identification information and/or the measurement result of the UE in the HANDOVER REQUIRED message.

Specifically, the AMF transparently forwards the content of the Source to Target Transparent Container field it receives to the MME. Alternatively, in step 1401, if the source base station identifier and/or the source cell identifier and/or the UE identification information and/or the measurement result of the UE are directly carried by the HANDOVER REQUIRED message, the GTP The control plane protocol signaling should also directly carry the source base station identifier and/or the source cell identifier and/or the UE identification information and/or the measurement result of the UE.

Step 1403: The MME sends a third message to the target base station eNB 1. The third message may be a HANDOVER REQUEST message. The HANDOVER REQUEST message is S1AP HANDOVER REQUEST message in this embodiment. The HANDOVER REQUEST message carries the source base station identifier and/or the source cell identifier and/or the UE identification information and/or the measurement result of the UE in the HANDOVER REQUIRED message.

Specifically, the MME transparently forwards the content of the Source to Target Transparent Container field it receives to the target base station eNB1. Alternatively, in step 1402, if the GTP control plane protocol signaling directly carries the source base station identifier and/or the source cell identifier and/or the UE identification information and/or the measurement result of the UE, the HANDOVER REQUEST message should also directly carry the source base station identifier and/or the source cell identifier and/or the UE identification information and/or the measurement result of the UE.

Step 1404: The targeteNB 1 decides to initiate a secondary node addition process to the source gNB 0. The targeteNB 1 decides to initiate an SN addition process to the source gNB 0 according to the received UE measurement report and/or the source base station identifier and/or the source cell identifier.

The targeteNB 1 sends an SN addition request message to the gNB 0. The secondary node addition request message includes a UE identifier assigned by the source base station to the UE and/or a source cell identifier and/or source base station identifier. The UE identifier is a UE identifier received from the source base station gNB 0 through a HANDOVER REQUEST message. The message includes bearer information to be configured on the gNB 0.

The gNB 0 receives a secondary node addition request message. The gNB 0 can retrieve the context of the UE according to the UE identifier and/or the source cell identifier received in the message. For a bearer configured onto the gNB 0 (for example, a bearer terminating at a secondary node or an SCG bearer), the gNB 0 does not need to assign a transport layer address and a tunnel identifier for data forwarding. The gNB 0 only needs to perform internal data forwarding.

If the gNB 0 supports separate control plane and user plane architecture, the gNB 0 contains gNB centralized unit control plane unit (gNB-CU-CP) and gNB centralized unit user plane unit (gNB-CU-UP). The gNB0-CU-CP requests the gNB0-CU-UP to allocate tunnel information corresponding to each evolved radio access bearer E-RAB for the bearer(s) terminated at the gNB0-CU-UP. The tunnel information contains the transport layer address and the tunnel identifier. The gNB0-CU-UP allocates tunnel information for data forwarding to each requested E-RAB and sends it to the gNB0-CU-CP. For the bearer(s) terminated at the eNB1 at the target side, the gNB0-CU-CP does not need to request gNB0-CU-UP to allocate tunnel information for the E-RAB. The gNB0-CU-CP can find the UE context according to the received UE identifier and/or source cell identifier. The gNB0-CU-CP knows the bearer(s) terminated at the gNB0-CU-UP at the target side according to the UE context. The identification of the gNB0-CU-CP is the same as the secondary base station identification of gNB 0.

The gNB 0 sends an SN addition request acknowledge message to the eNB 1. The gNB 0 does not need to include the transport layer address and the tunnel identifier for data forwarding into the message. The secondary node addition request acknowledge message includes a UE identifier over the interface between the gNB 0 and the eNB 1 assigned by the gNB 0. The UE identifier may be an SgNB UE X2AP ID or an S-NG-RAN node UE XnAP ID.

Step 1405: The targeteNB 1 sends a sixth message to the MME. The sixth message may be a HANDOVER REQUEST ACKNOWLEDGE message. The HANDOVER REQUEST ACKNOWLEDGE message is S1AP HANDOVER REQUEST ACKNOWLEDGE message in this embodiment. For a bearer that performs data forwarding in a node (i.e. the base station) internal way or a bearer to be configured on the source base station after the handover, the target node eNB 1 does not need to include the transport layer address and the tunnel identifier of the bearer for data forwarding in the HANDOVER REQUEST ACKNOWLEDGE message. The HANDOVER REQUEST ACKNOWLEDGE message directly carries, or the Target to Source Transparent Container field in the HANDOVER REQUEST ACKNOWLEDGE message carries the UE identifier over the interface between the gNB 0 and the eNB 1 assigned by the gNB 0, and/or the secondary base station identifier of the gNB 0, and/or the target base station identifier of the eNB 1.

Step 1406: The MME sends a seventh message to the AMF. The seventh message may be a FORWARD RELOCATION RESPONSE message. The FORWARD RELOCATION RESPONSE message is GTP FORWARD RELOCATION RESPONSE message in this embodiment. The FORWARD RELOCATION RESPONSE message carries the UE identifier over the interface between the gNB 0 and the eNB 1 assigned by the gNB 0, and/or the secondary base station identifier of the gNB 0, and/or the target base station identifier of the eNB 1.

Step 1407: The AMF sends an eighth message to the source base station gNB 0. The eighth message may be a HANDOVER COMMAND message. The HANDOVER COMMAND message is NGAP HANDOVER COMMAND message in this embodiment. The HANDOVER COMMAND message carries the UE identifier over the interface between the gNB 0 and the eNB 1 assigned by the gNB 0, and/or the secondary base station identifier of the gNB 0, and/or the target base station identifier of the eNB 1.

The gNB 0 finds the context of the UE according to the received UE identifier over the interface between the gNB 0 and the eNB assigned by the gNB 0 and/or secondary base station identifier of the gNB 0 and/or target base station identifier of the eNB 1. For a bearer configured onto the gNB 0 at the target base station eNB 1 (for example, a bearer terminating at a secondary node or an SCG bearer), the gNB 0 performs internal data forwarding.

If the gNB 0 supports separate control plane and user plane architecture, the gNB0-CU-CP receives tunnel information for data forwarding corresponding to each E-RAB. The tunnel information contains the transport layer address and tunnel identifier. The gNB0-CU-CP sends tunnel information corresponding to each E-RAB to the gNB0-CU-UP. For the bearer(s) terminated at the gNB0-CU-UP at the target side, the gNB0-CU-CP does not need to send the E-RAB tunnel information to the gNB0-CU-UP. For the bearer terminated at the target node eNB1 at the target side, the gNB0-CU-CP sends the E-RAB tunnel information to the gNB0-CU-UP. The gNB0-CU-CP finds the UE context according to the received UE identifier over the interface between the gNB 0 and eNB allocated by the gNB0-CU-CP, and/or the secondary base station identifier of gNB 0, and/or the target base station identifier of eNB 1. The gNB0-CU-CP knows the bearer(s) terminated at the gNB0-CU-UP at the target side according to the UE context. The identification of the gNB0-CU-CP is the same as the secondary base station identification of gNB 0. For the bearer(s) terminated at the gNB0-CU-UP at the target side, the gNB0-CU-UP performs internal data forwarding. For a bearer terminated at the eNB 1 at the target side, the gNB0-CU-UP forwards the data to eNB 1. For the direct data forwarding, the gNB0-CU-UP sends data to the tunnel corresponding to each E-RAB. The data sent by gNB0-CU-UP to each E-RAB tunnel has no service quality assurance (Qos) flow identification (QFI) information. The gNB0-CU-UP sends the data of each Qos flow to the corresponding E-RAB tunnel according to the mapping of per Qos flow to a corresponding the E-RAB.

Step 1408: A subsequent handover process is performed.

The method can simplify the data forwarding process in the handover process. The above technical scheme is described in a scenario where the source base station and the secondary base station serving the UE after the handover are logically the same entity in the fourteenth embodiment. However, the above technical scheme is not limited thereto. In addition, the above technical scheme is also applicable to a scenario where the secondary base station serving the UE after the handover and the source base station are co-located nodes. On the one hand, the source base station identifier and/or the source cell identifier and/or the UE identification information and/or the measurement result of the UE are sent by the source base station to the target base station, and sent by the target base station to the source base station as the secondary base station, so that for the bearer configured onto the source base station (for example, a bearer terminating at a secondary node or an SCG bearer), the source base station performs internal data forwarding. On the other hand, the target base station may also send the UE identifier over the interface between the gNB 0 and the eNB assigned by the gNB 0 and/or the secondary node identifier of the gNB 0 and/or the target node identifier of the eNB 1 to the source base station gNB 0, the gNB 0 finds the context of the UE according to the UE identifier and/or the secondary node identifier of the gNB 0 and/or the target node identifier of the eNB 1 it receives, and for the bearer configured onto gNB 0 at the target base station eNB 1 (for example, a bearer terminating at a secondary node bearer or an SCG bearer), the gNB 0 performs internal data forwarding. This technical scheme includes the above two aspects to be implemented in a combined or separate manner. Compared with other technical schemes, the above technical scheme does not need to forward data from the source base station to the target base station and from the target master base station to the target secondary base station as in the existing handover mechanism.

In summary, according to the present disclosure, the secondary node identification information makes it possible for the connection with the secondary node before the handover to be maintained after the handover is completed, providing the possibility of avoiding unnecessary forwarding; further, the secondary node can determines, according to the related information, whether the context of the UE already existing thereon is to be kept after the handover is ended, thereby avoiding that the data about the UE is erroneously or unnecessarily deleted; furthermore, for the downlink data of the UE that has been transmitted to the secondary node but has not been transmitted to the UE before the handover is completed, when the secondary node is used as a secondary node before the handover, the secondary node can find the context of the UE that has been established thereon according to the UE identification information, and the secondary node does not need to perform data forwarding before and after the handover as in the existing mechanism, avoiding the waste of resources and reducing the delay of the downlink data; even further, trigger scenarios for the secondary node addition preparation process that are not explicitly defined in the existing mechanism are defined.

Figure 15:
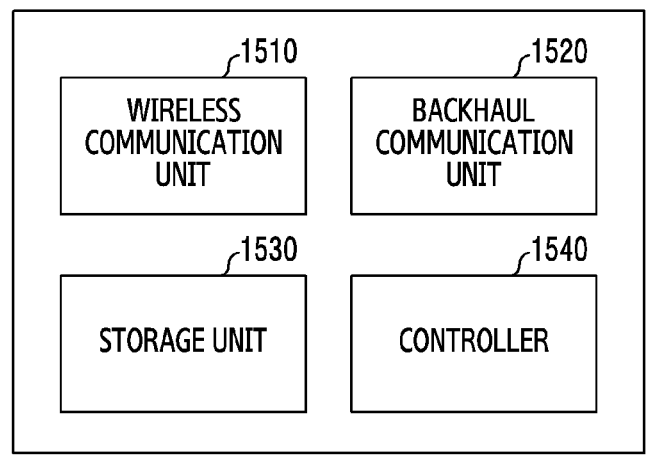
FIG. 15 shows a configuration of a network entity for next generation node B (gNB) or evolved node B (eNB) in a communication system.

FIG. 15 shows a configuration of a network entity for next generation node B (gNB) or evolved node B (eNB) in a communication system.

FIG. 15 shows a configuration of a network entity in a wireless communication system according to various embodiments. The configuration illustrated in FIG. 15 may be understood as a configuration of the network entity. Terms such as " . . . unit", " . . . device" used below refer to a unit for processing at least one function or operation, which may be implemented by hardware, software, or a combination of hardware and software. For example, the network entity comprises a base station. The network entity may be refereed as next generation node B (gNB) or evolved node B (eNB).

Referring to FIG. 15, the network entity includes a wireless communication unit 1510, a backhaul communication unit 1520, a storage unit 1530, and a controller 1540.

The wireless communication unit 1510 performs functions for transmitting and receiving a signal via a wireless channel. For example, the wireless communication unit 1510 performs a function of conversion between a baseband signal and a bitstream according to the physical layer standard of the system. For example, the wireless communication unit 1510 generates complex symbols during data transmission by encoding and modulating a transmission bitstream. In addition, the wireless communication unit 1510 restores, when receiving data, a reception bitstream through demodulation and decoding of the baseband signal.

In addition, the wireless communication unit 1510 up-converts a baseband signal into an RF (radio-frequency) band signal and then transmits the signal via an antenna, and down-converts an RF-band signal received via the antenna into a baseband signal. To this end, the wireless communication unit 1510 may include a transmission filter, a reception filter, an amplifier, a mixer, an oscillator, a DAC (digital-to-analog convertor), and an ADC (analog-to-digital converter). In addition, the wireless communication unit 1510 may include a plurality of transmission/reception paths. Furthermore, the wireless communication unit 1510 may include at least one antenna array configured by a plurality of antenna elements.

With regard to hardware, the wireless communication unit 1510 may be configured by a digital unit and an analog unit, and the analog unit may be configured by a plurality of sub-units according to operating power, operating frequency, and the like. The digital unit may be implemented as at least one processor (e.g., DSP (digital signal processor)). The wireless communication unit 1510 transmits and receives a signal as described above. Accordingly, all or part of the wireless communication unit 1510 may be referred to as a "transmitter", a "receiver", or a "transceiver". In addition, transmission and reception performed via a wireless channel are used in the following description as a meaning of including a process performed as described above by the wireless communication unit 1510.

A backhaul communication unit 1520 provides an interface for performing communication with other nodes in a network. That is, the backhaul communication unit 1520 converts a bitstream transmitted from a network entity to another node, for example, another access node, another network entity, an upper node, a core network, or the like into a physical signal, and converts a physical signal received from another node into a bitstream.

The storage unit 1530 stores data, such as a basic program, applications, and configuration information, for the operation of a network entity. The storage unit 1530 may configured as volatile memory, nonvolatile memory, or a combination of volatile memory and nonvolatile memory. Further, the storage unit 1530 provides the stored data at the request of the controller 1540.

The controller 1540 controls the overall operations of a network entity. For example, the controller 1540 transmits and receives a signal via the wireless communication unit 1510 or the backhaul communication unit 1520. In addition, the controller 1540 records and reads data in the storage unit 1530. The controller 1540 may perform the functions of a protocol stack required by a communication standard. According to another embodiment, the protocol stack may be included in the wireless communication unit 1510. To this end, the controller 1540 may include at least one processor. According to various embodiments, the controller 1540 may control the network entity to perform operations according to various embodiments described above.

Figure 16:
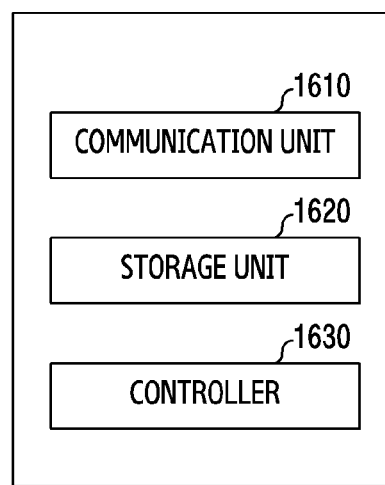
FIG. 16 illustrates a configuration of a network node in a communication system.

FIG. 16 illustrates a configuration of a network node in a communication system. The configuration shown in FIG. 16 may be understood as a configuration of a device having at least one function of any core network entity like AMF, SMF, UPF, or MME. Terms such as " . . . unit", " . . . device" used below refer to a unit that processes at least one function or operation, which may be implemented by hardware or software, or a combination of hardware and software.

Referring to FIG. 16, the network node includes a communication unit 1610, a storage unit 1620, and a controller 1630.

The communication unit 1610 provides an interface for performing communication with other devices in a network. That is, the communication unit 1610 converts a bitstream transmitted from the network node to another device into a physical signal, and converts a physical signal received from another device into a bitstream. That is, the communication unit 1610 may transmit and receive signals. Accordingly, the communication unit 1610 may be referred to as a modem, a transmitter, a receiver, or a transceiver. At this time, the communication unit 1610 allows the network node to communicate with other devices or systems via a backhaul connection (e.g., wired backhaul or wireless backhaul) or via a network.

The storage unit 1620 stores data, such as a basic program, applications, and configuration information, for the operation of the network node. The storage unit 1620 may be configured as volatile memory, nonvolatile memory, or a combination of volatile memory and nonvolatile memory. Further, the storage unit 1620 provides the stored data at the request of the controller 1630.

The controller 1630 controls the overall operations of a network function in the core network. For example, the controller 1630 transmits and receives a signal via the communication unit 1610. In addition, the controller 1630 records and reads data in the storage unit 1620. To this end, the controller 1630 may include at least one processor. According to various embodiments, the controller 1630 may control a core network entity to perform operations according to various embodiments described above.

According to embodiments, a method for User Equipment (UE) handover, comprising: sending by a source base station a first message to a core network element connected with the source base station, the first message carrying UE identification information for identifying the UE.

In some embodiments, the first message carries secondary base station identification information for identifying a secondary base station.

In some embodiments, the first message carries a source base station identifier for identifying the source base station and/or a source cell identifier for identifying a source cell and/or a measurement result of the UE.

In some embodiments, the first message is a handover request message of base station-core network interface application protocol signaling.

In some embodiments, the method further comprises receiving by the source base station an eighth message from the core network element connected with the source base station, the eighth message carrying a field for indicating whether the context of the UE that already exists on a secondary base station is to be kept after the handover.

In some embodiments, the method further comprises receiving by the source base station an eighth message from the core network element connected with the source base station, the eighth message carrying the UE identification information for identifying the UE and/or a secondary base station identifier for identifying a secondary base station and/or a target base station identifier for identifying a target base station.

In some embodiments, the eighth message is a handover command message of base station-core network interface application protocol signaling.

In some embodiments, the field for indicating whether the context of the UE that already exists on the secondary base station is to be kept after the handover is a UE Context Kept Indicator field.

In some embodiments, the UE identification information is a UE identifier assigned by a secondary node to the UE.

In some embodiments, the UE identifier is an SgNB UE X2AP ID or an S-NG-RAN node UE XnAP ID.

In some embodiments, when the UE identification information is a cell radio network temporary identifier C-RNTI assigned by a secondary node to the UE, the first message further carries a primary secondary cell identifier of the UE at the secondary node and/or secondary base station identification information.

In some embodiments, the carrying is carrying directly by the message, or carrying by a subfield carried by a Source to Target Transparent Container field carried by the message.

In some embodiments, the carrying is carrying directly by the message, or carrying by a subfield carried by a Target to Source Transparent Container field carried by the message.

According to embodiments, an apparatus for User Equipment (UE) handover performs any one of the above methods.

According to embodiments, a computer device for a User Equipment (UE), comprising a processor and a memory storing thereon instructions, which when executed by the processor, performs one of the above methods.

While embodiments of the disclosure have been described in the above, it should be recognized that these descriptions are merely illustrative and not restrictive. In addition, in the above, the definitions of "base station" and "node" can be used and understood equivalently.

As will be appreciated by those skilled in the art, the present invention includes devices related to performing one or more of the operations described in this application. These devices may be specially designed and manufactured for the required purpose, or may include known devices in general-purpose computers. These devices have computer programs stored therein that are selectively activated or reconstructed. Such computer program may be stored in a device (e.g., a computer) readable medium or in any type of medium suitable for storing electronic instructions and coupled to a bus, respectively. The computer readable medium includes, but not limited to, any types of disks (including floppy disks, hard disks, optical disks, CD-ROMs, and magneto-optical disks), ROM (Read-Only Memory), RAM (Random Access Memory), EPROM (Erasable Programmable Read-Only Memory), EEPROM (Electrically Erasable Programmable Read-Only Memory), flash memory, magnetic card or optical card. That is, a readable medium includes any medium that stores or transports information in a readable form by a device (e.g., a computer).

Those skilled in the art may understand that these computer program instructions may be provided to a general-purpose computer, a professional computer or a processor of other programmable data processing methods to be realized, so that the scheme disclosed in the present invention may be performed by the computer or the processor of other programmable data processing method.

Those skilled in the art may understand that steps, measures and schemes in various operations, methods, processes that have been discussed in the present invention can be alternated, modified, combined or deleted. Further, other steps, measures and schemes in various operations, methods, processes that have been discussed in the present invention can also be alternated, modified, rearranged, decomposed, combined or deleted. Further, the prior art that have steps, measures and schemes in various operations, methods, processes having been disclosed in the present invention can also be alternated, modified, rearranged, decomposed, combined or deleted.

The above described are merely preferred embodiments of the present application and are not intended to limit the present application. Any modification, equivalent replacement, improvement, combination, partial combination, etc. made within the spirit and principle of the application should all be included in the protection scope of this application.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a mobility management entity (MME), the method comprising:
    receiving, from an access and mobility management function (AMF) for a source next generation node B (gNB), a message associated with a handover required message for an inter-system handover from a 5G system (5GS) to an evolved packet system (EPS) with the source gNB associated with a target secondary gNB (SgNB), wherein the source gNB and the target SgNB correspond to a same network entity;
    transmitting, to an evolved node B (eNB), a handover request message for the inter-system handover with the source gNB; and
    receiving, from the eNB, an acknowledge of the handover request message,
    wherein the handover required message includes a node identifier of the source gNB and a user equipment (UE) identifier allocated at the source gNB,
    wherein the handover request message includes the node identifier of the source gNB and the UE identifier allocated at the source gNB, and wherein the eNB is associated with the target SgNB in a dual connectivity based on the node identifier of the source gNB in the handover request message.

2. The method of claim 1, further comprising:
transmitting, to the AMF, a message to transmit a handover command message from the AMF to the target SgNB.

3. The method of claim 1,
wherein the handover required message includes a Source eNB to Target eNB Transparent Container for carrying the node identifier of the source gNB and the UE identifier allocated at the source gNB, and
wherein the handover request message includes a Source eNB to Target eNB Transparent Container for carrying the node identifier of the source gNB and the UE identifier allocated at the source gNB.

4. A method performed by an evolved node B (eNB), the method comprising:
receiving, from a mobility management entity (MME), a handover request message for an inter-system handover from a 5G system (5GS) to an evolved packet system (EPS) with a source next generation node B (gNB) associated with a target secondary gNB (SgNB), wherein the source gNB and the target SgNB correspond to a same network entity; and
transmitting, to the MME, an acknowledge of the handover request message,
wherein the handover request message includes a node identifier of the source gNB and a user equipment (UE) identifier allocated at the source gNB, and
wherein the eNB is associated with the target SgNB in a dual connectivity based on the node identifier of the source gNB in the handover request message.

5. The method of claim 4, further comprising:
transmitting, to the target SgNB, an SgNB addition request message; and
receiving, from the target SgNB, an SgNB addition request acknowledge message as a response of the SgNB addition request message,
wherein the SgNB addition request message includes the UE identifier allocated at the source gNB.

6. The method of claim 4,
wherein the handover request message includes a Source eNB to Target eNB Transparent Container for carrying the node identifier of the source gNB and the UE identifier allocated at the source gNB.

7. A method performed by a network entity, the method comprising:
operating a source next generation node B (gNB);
transmitting, to an access and mobility management function (AMF), a handover required message for an inter-system handover from a 5G system (5GS) to an evolved packet system (EPS) with the source gNB associated with a target secondary gNB (SgNB), wherein the source gNB and the target SgNB correspond to a same network entity; and
receiving, from the AMF, a handover command message,
wherein the handover required message includes a node identifier of the source gNB and a user equipment (UE) identifier allocated at the source gNB, and
wherein the target SgNB is associated with an evolved node B (eNB) in a dual connectivity based on the node identifier of the source gNB in the handover required message.

8. The method of claim 7, further comprising:
receiving, from the eNB, an SgNB addition request message; and
transmitting, to the eNB, an SGN addition request acknowledge message as a response of the SgNB addition request message,
wherein the SgNB addition request message includes the UE identifier allocated at the source gNB.

9. The method of claim 7, further comprising:
if a bearer terminated at the target SgNB is identified, performing a data forwarding in a node-internal way for the bearer terminated at the target SgNB.

10. The method of claim 7,
wherein the handover required message includes a Source eNB to Target eNB Transparent Container for carrying the node identifier of the source gNB and the UE identifier allocated at the source gNB.

11. A mobility management entity (MME), comprising:
at least one transceiver; and
at least one processor, wherein the at least one processor is configured to:
receive, from an access and mobility management function (AMF) for a source next generation node B (gNB), a message associated with a handover required message for an inter-system handover from a 5G system (5GS) to an evolved packet system (EPS) with the source gNB associated with a target secondary gNB (SgNB), wherein the source gNB and the target SgNB correspond to a same network entity;
transmit, to an evolved node B (eNB), a handover request message for the inter-system handover with the source gNB; and
receive, from the eNB, an acknowledge of the handover request message,
wherein the handover required message includes a node identifier of the source gNB and a user equipment (UE) identifier allocated at the source gNB,
wherein the handover request message includes the node identifier of the source gNB and the UE identifier allocated at the source gNB, and
wherein the eNB is associated with the target SgNB in a dual connectivity based on the node identifier of the source gNB in the handover request message.

12. The MME of claim 11, wherein the at least one processor is further configured to:
transmit, to AlVIF, a message to transmit a handover command message from the AMF to the target SgNB.

13. The MME of claim 11,
wherein the handover required message includes a Source eNB to Target eNB Transparent Container for carrying the node identifier of the source gNB and the UE identifier allocated at the source gNB, and
wherein the handover request message includes a Source eNB to Target eNB Transparent Container for carrying the node identifier of the source gNB and the UE identifier allocated at the source gNB.

14. An evolved node B (eNB), comprising:
at least one transceiver; and
at least one processor, wherein the at least one processor is configured to:
receive, from a mobility management entity (MME), a handover request message for an inter-system handover from a 5G system (5GS) to an evolved packet system (EPS) with a source next generation node B (gNB) associated with a target secondary gNB (SgNB), wherein the source gNB and the target SgNB correspond to a same network entity; and
transmit, to the MME, an acknowledge of the handover request message, wherein the handover request message includes a node identifier of the source gNB and a user equipment (UE) identifier allocated at the source gNB, and wherein the eNB is associated with the target SgNB in a dual connectivity based on the node identifier of the source gNB in the handover request message.

15. The eNB of claim 14, wherein the at least one processor is further configured to:

transmit, to the target SgNB, an SgNB addition request message; and receive, from the target SgNB, an SgNB addition request acknowledge message as a response of the SgNB addition request message, wherein the SgNB addition request message includes the UE identifier allocated at the source gNB.

16. The eNB of claim 14, wherein the handover request message includes a Source eNB to Target eNB Transparent Container for carrying the node identifier of the source gNB and the UE identifier allocated at the source gNB.

17. A network entity, comprising:

at least one transceiver; and at least one processor, wherein the at least one processor is configured to:

operate a source next generation node B (gNB);

transmit, to an access and mobility management function (AMF), a handover required message for an inter-system handover from a 5G system (5GS) to an evolved packet system (EPS) with the source gNB associated with a target secondary gNB (SgNB), wherein the source gNB and the target SgNB correspond to a same network entity; and receive, from the AMF, a handover command message, wherein the handover required message includes a node identifier of the source gNB and a user equipment (UE) identifier allocated at the source gNB, and wherein the target SgNB is associated with an evolved node B (eNB) in a dual connectivity based on the node identifier of source gNB in the handover required message.

18. The network entity of claim 17, wherein the at least one processor is further configured to:

receive, from the eNB, an SgNB addition request message; and transmit, to the eNB, an SGN addition request acknowledge message as a response of the SgNB addition request message, wherein the SgNB addition request message includes the UE identifier allocated at the source gNB.

19. The network entity of claim 17, wherein the at least one processor is further configured to:

if a bearer terminated at the target SgNB is identified, perform a data forwarding in a node-internal way for the bearer terminated at the target SgNB.

20. The network entity of claim 17, wherein the handover required message includes a Source eNB to Target eNB Transparent Container for carrying the node identifier of the source gNB and the UE identifier allocated at the source gNB.

* * * * *